(12) United States Patent
Hardwick

(10) Patent No.: US 11,054,806 B2
(45) Date of Patent: Jul. 6, 2021

(54) METHOD AND SYSTEM FOR SPACE PLANNING WITH CREATED PROTOTYPE OBJECTS

(71) Applicant: Barbara Hardwick, Des Plaines, IL (US)

(72) Inventor: Barbara Hardwick, Des Plaines, IL (US)

( * ) Notice: Subject to any disclaimer, the term of this patent is extended or adjusted under 35 U.S.C. 154(b) by 157 days.

(21) Appl. No.: 16/415,625

(22) Filed: May 17, 2019

(65) Prior Publication Data
US 2019/0354084 A1 Nov. 21, 2019

Related U.S. Application Data

(60) Provisional application No. 62/674,073, filed on May 21, 2018.

(51) Int. Cl.
| | |
|---|---|
| G05B 19/4099 | (2006.01) |
| G06Q 20/10 | (2012.01) |
| G06Q 50/04 | (2012.01) |
| H04L 29/08 | (2006.01) |
| B33Y 50/00 | (2015.01) |
| G06F 30/13 | (2020.01) |
| H04L 12/58 | (2006.01) |
| G06K 19/06 | (2006.01) |
| H04W 4/14 | (2009.01) |
| G06F 111/02 | (2020.01) |

(52) U.S. Cl.
CPC ......... *G05B 19/4099* (2013.01); *B33Y 50/00* (2014.12); *G06F 30/13* (2020.01); *G06Q 20/10* (2013.01); *G06Q 50/04* (2013.01); *H04L 67/10* (2013.01); *G05B 2219/49023* (2013.01); *G06F 2111/02* (2020.01); *G06K 19/06028* (2013.01); *G06K 19/06037* (2013.01); *H04L 51/32* (2013.01); *H04W 4/14* (2013.01)

(58) Field of Classification Search
None
See application file for complete search history.

(56) References Cited

U.S. PATENT DOCUMENTS

| | | |
|---|---|---|
| 7,797,261 B2 | 9/2010 | Yang |
| 8,260,728 B1 | 9/2012 | Walsh et al. |
| 8,463,765 B2 | 6/2013 | Lesavich |
| 9,037,654 B2 | 5/2015 | Lesavich et al. |
| 9,137,250 B2 | 9/2015 | Lesavich et al. |
| 9,361,479 B2 | 6/2016 | Lesavich et al. |
| 9,569,771 B2 | 2/2017 | Lesavich et al. |
| 9,782,936 B2 | 10/2017 | Glunz et al. |
| 9,817,922 B2 | 11/2017 | Glunz et al. |

(Continued)

*Primary Examiner* — Jason Lin
(74) *Attorney, Agent, or Firm* — Lesavich High-Tech Law Group, S.C.; Stephen Lesavich

(57) ABSTRACT

Method and system for space planning with created prototype objects. Templates for virtual objects are provided on a cloud application on a cloud server network device to create prototype objects. Actual prototype three dimensional (3D) objects are created in lightweight materials from selected templates with 3D printers, robots and/or manufacturing machines. The created prototype 3D objects are moved to and used in an actual physical space to confirm how actual objects represented by the 3D prototype objects will fit in the actual physical space and confirm a design for the actual physical space.

20 Claims, 10 Drawing Sheets

(56) References Cited

U.S. PATENT DOCUMENTS

| | | |
|---|---|---|
| 10,867,282 B2 | 12/2020 | Glunz |
| 10,949,805 B2 | 3/2021 | Glunz |
| 2005/0081161 A1* | 4/2005 | MacInnes ................ G06K 9/00 715/765 |
| 2006/0012611 A1* | 1/2006 | Dujmich ................ G06F 30/13 345/619 |
| 2011/0035802 A1 | 2/2011 | Arajujo |
| 2011/0208710 A1 | 8/2011 | Lesavich |
| 2012/0278622 A1 | 11/2012 | Lesavich et al. |
| 2013/0166256 A1* | 6/2013 | Wirx-Speetjens ..... B33Y 50/00 703/1 |
| 2014/0081599 A1* | 3/2014 | Bradley ................ G06F 30/13 703/1 |
| 2014/0189792 A1 | 7/2014 | Lesavich et al. |
| 2015/0248503 A1 | 9/2015 | Glunz et al. |
| 2015/0248504 A1* | 9/2015 | Glunz .................. B29C 64/386 700/98 |
| 2015/0379301 A1 | 12/2015 | Lesavich et al. |
| 2016/0321654 A1 | 11/2016 | Lesavich et al. |
| 2017/0061039 A1* | 3/2017 | Sweeney ................ G06F 30/13 |
| 2017/0132567 A1 | 5/2017 | Glunz |
| 2017/0132568 A1* | 5/2017 | Glunz .................. G06Q 10/101 |
| 2017/0248937 A1* | 8/2017 | Guimbretiere ........ B29C 64/386 |
| 2018/0157820 A1 | 6/2018 | Adams et al. |
| 2018/0158053 A1 | 6/2018 | Adams et al. |
| 2020/0134560 A1 | 4/2020 | McLinden et al. |
| 2020/0134745 A1 | 4/2020 | McLinden et al. |
| 2020/0380080 A1 | 12/2020 | Glunz |

\* cited by examiner

PROTOCOL STACK

FIG. 9
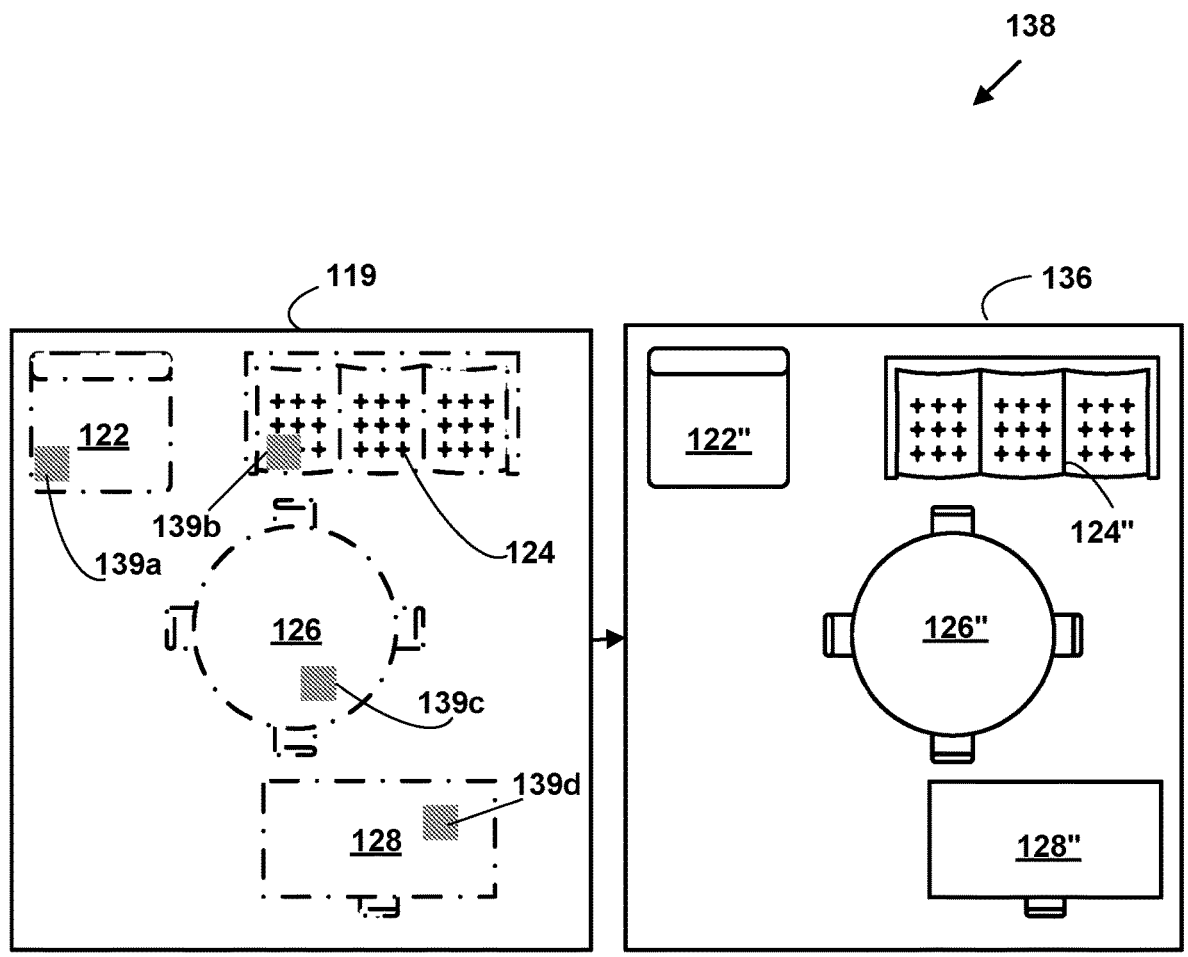
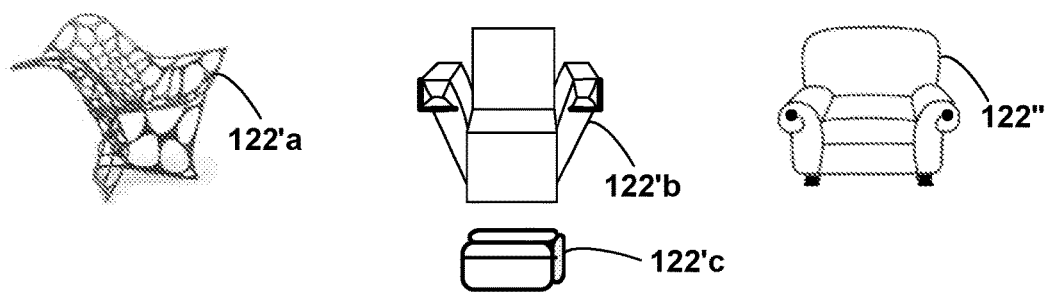
FOOTPRINT OBJECT

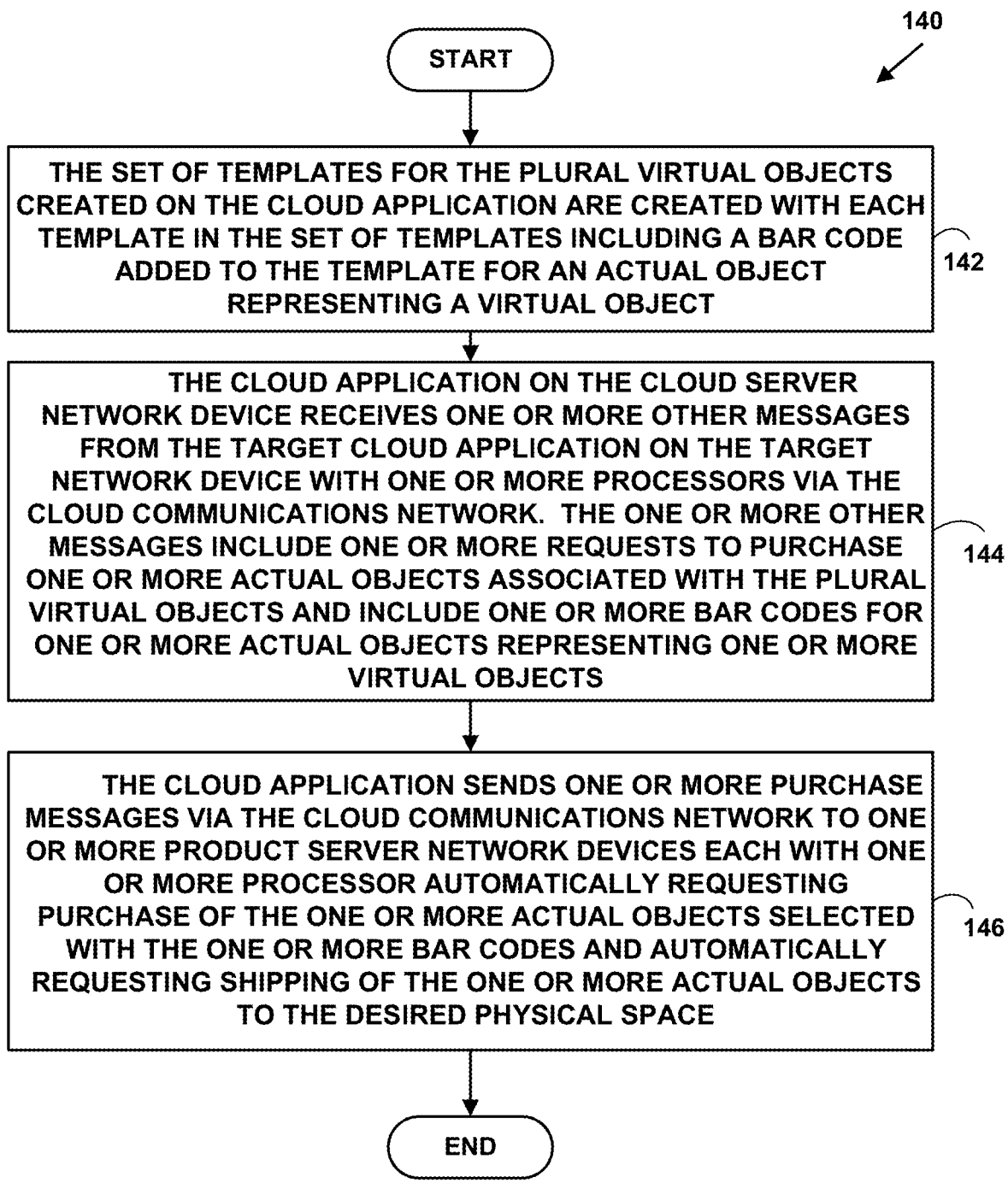

US 11,054,806 B2

METHOD AND SYSTEM FOR SPACE PLANNING WITH CREATED PROTOTYPE OBJECTS

CROSS REFERENCES TO RELATED APPLICATIONS

This application claims priority to U.S. Provisional Patent Application No. 62/674,073, filed on May 21, 2018, the contents of which are incorporated by reference.

FIELD OF INVENTION

This application relates to space planning. More specifically, it relates to a method and system for space planning with created prototypes objects.

BACKGROUND OF THE INVENTION

There are many different types of spaces in which physicals objects need to be placed during a planning stage. For example, in a residential house, the location of furniture, lighting, landscaping and other physical objects need to be carefully laid out and planned. In a factory, the location of machines, work stations, etc., also need to be laid out and carefully planned. For outside space, the location of trees, shrubs, plants and other landscaping elements also need to be carefully laid out and planned.

There are many problems associated with the planning of such spaces. One problem is that the physical objects need to be purchased. If the physical objects did not fit into a physical space, then they have to be returned. Another problem is that the physical objects (e.g., furniture, etc.) are often heavy and bulky. The physical objects must be transported from a location they were purchased from and moved in the desired physical space. If the physical objects do not fit into the desired physical space, then they have to be moved out and transported back to the location they were purchased from. The physical objects may include a size, shape, type or color that does not fit into a desired design plan.

There have been some attempts to provide solutions to these design problems. For example, computerized design systems such as Computer Aided Design (CAD) and other design system have used to create desired design plans. However, such design systems provide poor connections to the actual physical objects associated with virtual objects in the design systems.

In addition, these design systems still do not solve all of the problems associated with space planning. Thus, it is desirable to solve some of the problems associated with spacing planning.

SUMMARY OF THE INVENTION

In accordance with preferred embodiments of the present invention, some of the problems associated with space planning are overcome. A method and system for space planning with created prototype objects is presented.

Templates for virtual objects are provided on a cloud application on a cloud server network device to create prototype objects. Actual prototype three dimensional (3D) objects are created in lightweight materials from selected templates with 3D printers, robots and/or manufacturing machines. The created prototype 3D objects are moved to and used in an actual physical space to confirm how actual objects represented by the created 3D prototype objects will fit in the actual physical space and confirm a design for the actual physical space.

The foregoing and other features and advantages of preferred embodiments of the present invention will be more readily apparent from the following detailed description. The detailed description proceeds with references to the accompanying drawings.

BRIEF DESCRIPTION OF THE DRAWINGS

Preferred embodiments of the present invention are described with reference to the following drawings, wherein:

FIG. 9 is a block diagram illustrating space planning with created prototype objects; and FIG. 10 is a flow diagram illustrating a method for space planning with created prototype objects.

DETAILED DESCRIPTION OF PREFERRED EMBODIMENTS

Exemplary Space Planning System

Figure 1:
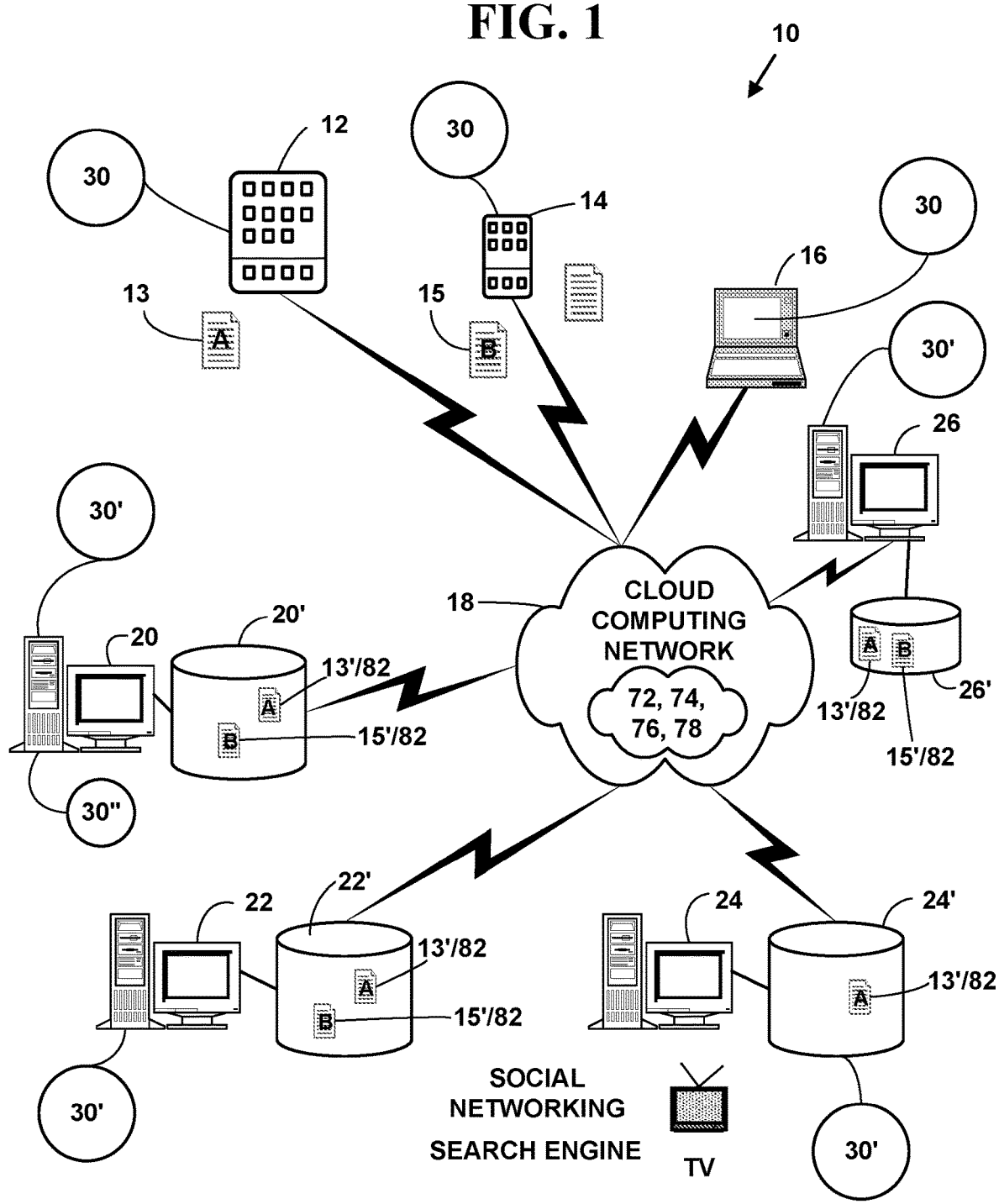
FIG. 1 is a block diagram illustrating space planning system.

FIG. 1 is a block diagram illustrating an exemplary space planning system 10. The exemplary electronic system 10 includes, but is not limited to, one or more target network devices 12, 14, 16 (only three of which are illustrated) including wearable devices 98-106 (FIG. 6) each with one or more processors and each with a non-transitory computer readable medium.

The one or more target network devices 12, 14, 16, 98-106 include, but are not limited to, multimedia capable desktop and laptop computers, tablet computers, facsimile machines, mobile phones, non-mobile phones, smart phones, Internet phones, Internet appliances, personal digital/data assistants (PDA), two-way pagers, digital cameras, portable game consoles (Play Station Portable by Sony, Game Boy by Sony, Nintendo DSI, etc.), non-portable game consoles (Xbox by Microsoft, Play Station by Sony, Wii by Nintendo, etc.), cable television (CATV), satellite television (SATV) and Internet television set-top boxes, digital televisions including high definition television (HDTV), three-dimensional (3DTV) televisions, wearable network devices and/or other types of network devices.

One or more smart network devices 12, 14 include smart phones such as the iPhone by Apple, Inc., Blackberry Storm and other Blackberry models by Research In Motion, Inc. (RIM), Droid by Motorola, Inc. HTC, Inc. other types of smart phones, etc. However, the present invention is not limited to such smart phone devices, and more, fewer or other devices can be used to practice the invention.

A "smart phone" is a mobile phone that offers more advanced computing ability and connectivity than a contemporary basic feature phone. Smart phones and feature phones may be thought of as handheld computers integrated with a mobile telephone, but while most feature phones are able to run applications based on platforms such as Java ME, a smart phone usually allows the user to install and run more advanced applications. Smart phones and/or tablet computers run complete operating system software providing a platform for application developers.

The operating systems include the iPhone OS, Android, Windows, etc. iPhone OS is a proprietary operating system for the Apple iPhone. Android is an open source operating system platform backed by Google, along with major hardware and software developers (such as Intel, HTC, ARM, Motorola and Samsung, etc.), that form the Open Handset Alliance.

The one or more smart network devices 12, 14 also include tablet computers such as the iPad, by Apple, Inc., the Surface by Microsoft, the HP Tablet, by Hewlett Packard, Inc., the Playbook, by RIM, Inc., the Tablet, by Sony, Inc.

The target network devices 12, 14, 16, 98-106 are in communications with a cloud communications network 18 via one or more wired and/or wireless communications interfaces. The cloud communications network 18, is also called a "cloud computing network" herein and the terms may be used interchangeably.

The plural target network devices 12, 14, 16, 98-106 sends and receives desired electronic content 13, 15 (e.g., electronic messages with electronic information, etc.) stored on the cloud communications network 18.

The cloud communications network 18 includes, but is not limited to, communications over a wire connected to the target network devices, wireless communications, and other types of communications using one or more communications and/or networking protocols.

Plural server network devices 20, 22, 24, 26 (only four of which are illustrated) each with one or more processors and a non-transitory computer readable medium include one or more associated databases 20', 22', 24', 26'. The plural network devices 20, 22, 24, 26 are in communications with the one or more target devices 12, 14, 16, 98-106 via the cloud communications network 18.

Plural server network devices 20, 22, 24, 26 (only four of which are illustrated) are physically located on one more public networks 76 (See FIG. 4), private networks 72, community networks 74 and/or hybrid networks 78 comprising the cloud network 18.

One or more server network devices (e.g., 20, etc.) securely stores a cloud content location map 17 and other plural server network devices (e.g., 22, 24, 26, etc.) store portions 13', 15' of desired electronic content 13, 15 as one or more cloud storage objects 82 (FIG. 5) as is described herein.

The plural server network devices 20, 22, 24 26, include, but are not limited to, World Wide Web servers, Internet servers, search engine servers, vertical search engine servers, social networking site servers, file servers, other types of electronic information servers, and other types of server network devices (e.g., edge servers, firewalls, routers, gateways, etc.).

The plural server network devices 20, 22, 24, 26 also include, but are not limited to, network servers used for cloud computing providers, etc.

The cloud communications network 18 includes, but is not limited to, a wired and/or wireless communications network comprising one or more portions of: the Internet, an intranet, a Local Area Network (LAN), a wireless LAN (WiLAN), a Wide Area Network (WAN), a Metropolitan Area Network (MAN), a Public Switched Telephone Network (PSTN), a Wireless Personal Area Network (WPAN) and other types of wired and/or wireless communications networks 18.

The cloud communications network 18 includes one or more gateways, routers, bridges and/or switches. A gateway connects computer networks using different network protocols and/or operating at different transmission capacities. A router receives transmitted messages and forwards them to their correct destinations over the most efficient available route. A bridge is a device that connects networks using the same communications protocols so that information can be passed from one network device to another. A switch is a device that filters and forwards packets between network segments based on some pre-determined sequence (e.g., timing, sequence number, etc.).

An operating environment for the network devices of the exemplary electronic information display system 10 include a processing system with one or more high speed Central Processing Unit(s) (CPU), processors, one or more memories and/or other types of non-transitory computer readable mediums. In accordance with the practices of persons skilled in the art of computer programming, the present invention is described below with reference to acts and symbolic representations of operations or instructions that are performed by the processing system, unless indicated otherwise. Such acts and operations or instructions are referred to as being "computer-executed," "CPU-executed," or "processor-executed."

It will be appreciated that acts and symbolically represented operations or instructions include the manipulation of electrical information by the CPU or processor. An electrical system represents data bits which cause a resulting transformation or reduction of the electrical information or biological information, and the maintenance of data bits at memory locations in a memory system to thereby reconfigure or otherwise alter the CPU's or processor's operation, as well as other processing of information. The memory locations where data bits are maintained are physical locations that have particular electrical, magnetic, optical, or organic properties corresponding to the data bits.

The data bits may also be maintained on a non-transitory computer readable medium including magnetic disks, optical disks, organic memory, and any other volatile (e.g., Random Access Memory (RAM)) or non-volatile (e.g., Read-Only Memory (ROM), flash memory, etc.) mass storage system readable by the CPU. The non-transitory computer readable medium includes cooperating or interconnected computer readable medium, which exist exclusively on the processing system or can be distributed among multiple interconnected processing systems that may be local or remote to the processing system.

Exemplary Electronic Content Display System

Figure 2:
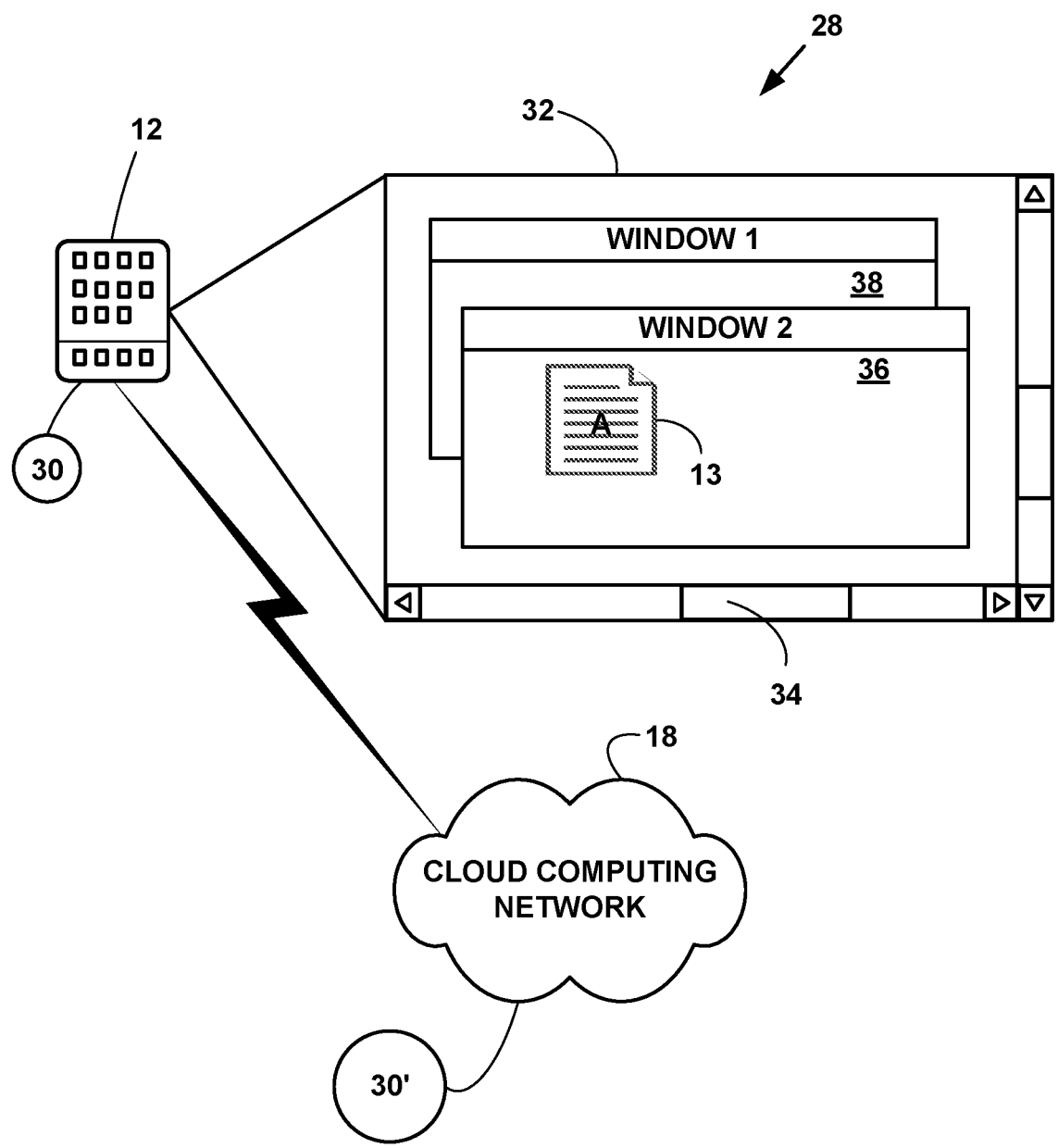
FIG. 2 is a block diagram illustrating an exemplary space planning display system.

FIG. 2 is a block diagram illustrating an exemplary space planning display system 28. The exemplary electronic information system display system includes, but is not limited to a target network device (e.g., 12, etc.) with a cloud application 30 and a display component 32. The cloud application 30 presents a graphical user interface (GUI) 34 on the display 32 component. The GUI 34 presents a multi-window 36, 38, etc. (only two of which are illustrated) interface to a user.

In one embodiment of the invention, the cloud application 30 is a software application. However, the present invention is not limited to this embodiment and the cloud application 30 can be hardware, firmware, hardware and/or any combination thereof. However, the present invention is not limited these embodiments and other embodiments can be used to practice the invention In another embodiment, a portion of the cloud application 30 is executing on the target network devices 12, 14, 16, 98-106 and another portion of the application 30' is executing on the server network devices 20, 22, 24, 26. However, the present invention is not limited these embodiments and other embodiments can be used to practice the invention.

In one embodiment, the application 30/30' includes an application programming interface (API). An application programming interface (API) specifies how some software components interact with each other. In addition to accessing databases or computer hardware, such as hard disk drives or video cards, an API is used to ease the work of programming GUI components, to allow integration of new features into existing applications (a so-called "plug-in API"), or to share data between otherwise distinct applications. An API includes a library that includes specifications for routines, data structures, object classes, and variables. In some other cases, notably for REpresentational State Transfer (REST) and Simple Object Access Protocol (SOAP) services, an API comes as a specification of remote calls exposed to the API consumers. However, the present invention is not limited these embodiments and other embodiments can be used to practice the invention, with and/or without an API.

Exemplary Networking Protocol Stack

Figure 3:
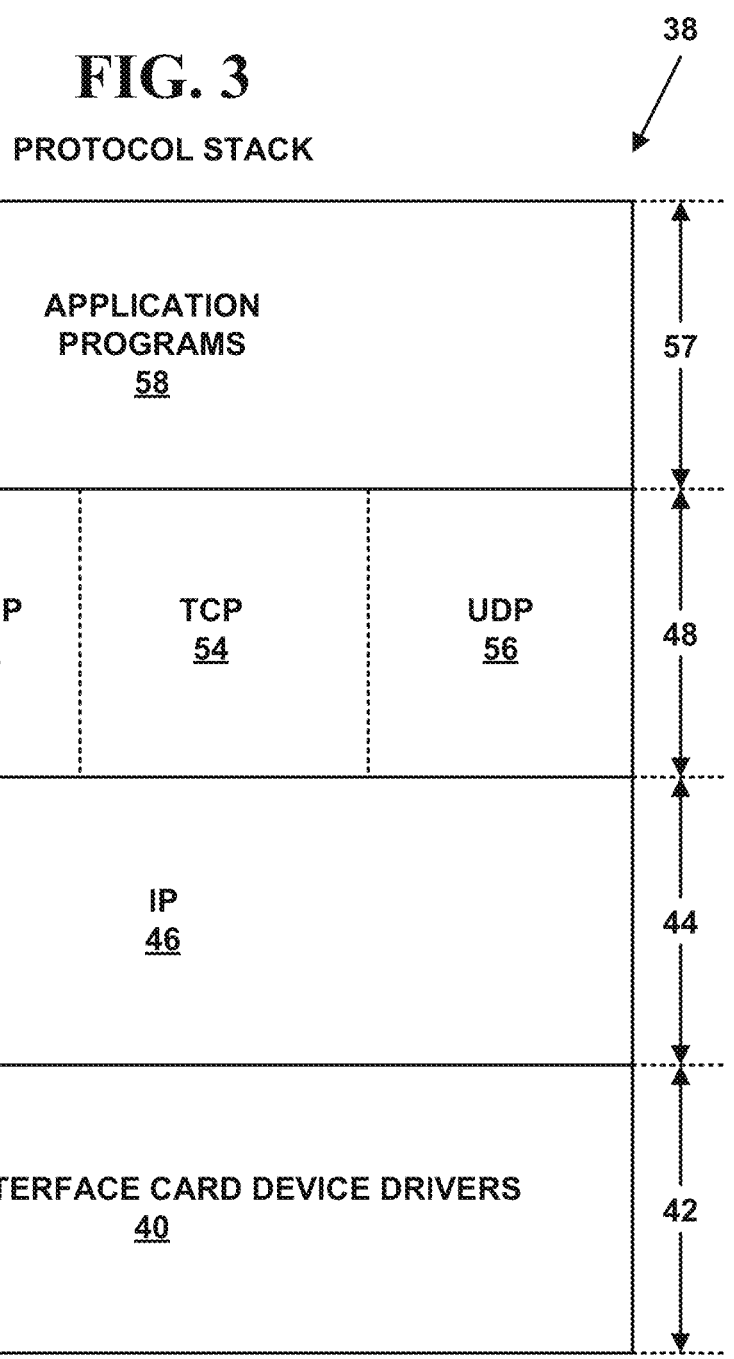
FIG. 3 a block diagram illustrating a layered protocol stack for network devices in the space planning display system.

FIG. 3 a block diagram illustrating a layered protocol stack 38 for network devices in the space planning display system 10. The layered protocol stack 38 is described with respect to Internet Protocol (IP) suites comprising in general from lowest-to-highest, a link 42, network 44, transport 48 and application 57 layer. However, more or fewer layers could also be used, and different layer designations could also be used for the layers in the protocol stack 38 (e.g., layering based on the Open Systems Interconnection (OSI) model including from lowest-to-highest, a physical, data-link, network, transport, session, presentation and application layer).

The network devices 12, 14, 16, 98-106, 20, 22, 24, 26 are connected to the communication network 18 with Network Interface Card (NIC) cards including device drivers 40 in a link layer 42 for the actual hardware connecting the network devices 12, 14, 16, 98-106, 20, 22, 24, 26 to the cloud communications network 18. For example, the NIC device drivers 40 may include a serial port device driver, a digital subscriber line (DSL) device driver, an Ethernet device driver, a wireless device driver, a wired device driver, etc. The device drivers interface with the actual hardware being used to connect the network devices to the cloud communications network 18. The NIC cards have a medium access control (MAC) address that is unique to each NIC and unique across the whole cloud network 18. The Medium Access Control (MAC) protocol is used to provide a data link layer of an Ethernet LAN system and for other network systems.

Above the link layer 42 is a network layer 44 (also called the Internet Layer for Internet Protocol (IP) suites). The network layer 44 includes, but is not limited to, an IP layer 46.

IP 46 is an addressing protocol designed to route traffic within a network or between networks. However, more fewer or other protocols can also be used in the network layer 44, and the present invention is not limited to IP 46. For more information on IP 46 see IETF RFC-791, incorporated herein by reference.

Above network layer 44 is a transport layer 48. The transport layer 48 includes, but is not limited to, an optional Internet Group Management Protocol (IGMP) layer 50, an Internet Control Message Protocol (ICMP) layer 52, a Transmission Control Protocol (TCP) layer 52 and a User Datagram Protocol (UDP) layer 54. However, more, fewer or other protocols could also be used in the transport layer 48.

Optional IGMP layer 50, hereinafter IGMP 50, is responsible for multicasting. For more information on IGMP 50 see RFC-1112, incorporated herein by reference. ICMP layer 52, hereinafter ICMP 52 is used for IP 46 control. The main functions of ICMP 52 include error reporting, reachability testing (e.g., pinging, etc.), and route-change notification, and performance, subnet addressing and other maintenance. For more information on ICMP 52 see RFC-792, incorporated herein by reference. Both IGMP 50 and ICMP 52 are not required in the protocol stack 38. ICMP 52 can be used alone without optional IGMP layer 50.

TCP layer 54, hereinafter TCP 54, provides a connection-oriented, end-to-end reliable protocol designed to fit into a layered hierarchy of protocols which support multi-network applications. TCP 54 provides for reliable inter-process communication between pairs of processes in network devices attached to distinct but interconnected networks. For more information on TCP 54 see RFC-793, incorporated herein by reference.

UDP layer 56, hereinafter UDP 56, provides a connectionless mode of communications with datagrams in an interconnected set of computer networks. UDP 56 provides a transaction oriented datagram protocol, where delivery and duplicate packet protection are not guaranteed. For more information on UDP 56 see RFC-768, incorporated herein by reference. Both TCP 54 and UDP 56 are not required in protocol stack 38. Either TCP 54 or UDP 56 can be used without the other.

Above transport layer 48 is an application layer 57 where application programs (e.g., 30, 30', etc.) to carry out desired functionality for a network device reside. For example, the application programs 58 for the client network devices 12, 14, 16, 98-106 may include a web-browsers or other application programs, cloud application program 30, while application programs for the server network devices 20, 22, 24, 26 may include other application programs (e.g., 30', etc.).

However, the protocol stack 38 is not limited to the protocol layers illustrated and more, fewer or other layers and protocols can also be used in protocol stack 38. In addition, other protocols from the Internet Protocol suites (e.g., Simple Mail Transfer Protocol, (SMTP), Hyper Text Transfer Protocol (HTTP), File Transfer Protocol (FTP), Dynamic Host Configuration Protocol (DHCP), DNS, etc.) and/or other protocols from other protocol suites may also be used in protocol stack 38.

Preferred embodiments of the present invention include network devices and wired and wireless interfaces that are compliant with all or part of standards proposed by the Institute of Electrical and Electronic Engineers (IEEE), International Telecommunications Union-Telecommunication Standardization Sector (ITU), European Telecommunications Standards Institute (ETSI), Internet Engineering Task Force (IETF), U.S. National Institute of Security Technology (NIST), American National Standard Institute (ANSI), Wireless Application Protocol (WAP) Forum, Bluetooth Forum, or the ADSL Forum.

Exemplary Wireless Interfaces

In one embodiment of the present invention, the wireless interfaces on network devices 12, 14, 16, 98-106, 20, 22, 24, 26 include but are not limited to, 3G and/or 4G IEEE 802.11a, 802.11b, 802.11g, 802.11n, 802.15.4 (ZigBee), "Wireless Fidelity" (Wi-Fi), "Worldwide Interoperability for Microwave Access" (WiMAX), ETSI High Performance Radio Metropolitan Area Network (HIPERMAN), "RF Home," Near Field Communications (NFC) and/or Machine-to-Machine (M2M) wireless interfaces. In another embodiment of the present invention, the wireless sensor device may include an integral or separate Bluetooth and/or infra data association (IrDA) module for wireless Bluetooth or wireless infrared communications. However, the present invention is not limited to such an embodiment and other 802.11xx and other types of wireless interfaces can also be used.

802.11b is a short-range wireless network standard. The IEEE 802.11b standard defines wireless interfaces that provide up to 11 Mbps wireless data transmission to and from wireless devices over short ranges. 802.11a is an extension of the 802.11b and can deliver speeds up to 54 Mbps. 802.11g deliver speeds on par with 802.11a. However, other 802.11XX interfaces can also be used and the present invention is not limited to the 802.11 protocols defined. The IEEE 802.11a, 802.11b and 802.11g standards are incorporated herein by reference.

Wi-Fi is a type of 802.11xx interface, whether 802.11b, 802.11a, dual-band, etc. Wi-Fi devices include an RF interfaces such as 2.4 GHz for 802.11b or 802.11g and 5 GHz for 802.11a. More information on Wi-Fi can be found at the domain name www.weca.net.

802.15.4 (Zigbee) is low data rate network standard used for mesh network devices such as sensors, interactive toys, smart badges, remote controls, and home automation. The 802.15.4 standard provides data rates of 250 kbps, 40 kbps, and 20 kbps., two addressing modes; 16-bit short and 64-bit IEEE addressing, support for critical latency devices, such as joysticks, Carrier Sense Multiple Access/Collision Avoidance, (CSMA-CA) channel access, automatic network establishment by a coordinator, fully handshaked protocol for transfer reliability, power management to ensure low power consumption for multi-month to multi-year battery usage and up to 16 channels in the 2.4 GHz Industrial, Scientific and Medical (ISM) band (Worldwide), 10 channels in the 915 MHz (US) and one channel in the 868 MHz band (Europe). The IEEE 802.15.4-2003 standard is incorporated herein by reference. More information on 802.15.4 and ZigBee can be found at the domain name "www.ieee802.org" and "www.zigbee.org" respectively.

WiMAX is an industry trade organization formed by leading communications component and equipment companies to promote and certify compatibility and interoperability of broadband wireless access equipment that conforms to the IEEE 802.16XX and ETSI HIPERMAN. HIPERMAN is the European standard for metropolitan area networks (MAN).

The IEEE The 802.16a and 802.16g standards are wireless MAN technology standard that provides a wireless alternative to cable, DSL and T1/E1 for last mile broadband access. It is also used as complimentary technology to connect IEEE 802.11XX hot spots to the Internet.

The IEEE 802.16a standard for 2-11 GHz is a wireless MAN technology that provides broadband wireless connectivity to fixed, portable and nomadic devices. It provides up to 50-kilometers of service area range, allows users to get broadband connectivity without needing direct line of sight with the base station, and provides total data rates of up to 280 Mbps per base station, which is enough bandwidth to simultaneously support hundreds of businesses with T1/E1-type connectivity and thousands of homes with DSL-type connectivity with a single base station. The IEEE 802.16g provides up to 100 Mbps.

The IEEE 802.16e standard is an extension to the approved IEEE 802.16/16a/16g standard. The purpose of 802.16e is to add limited mobility to the current standard which is designed for fixed operation.

The ESTI HIPERMAN standard is an interoperable broadband fixed wireless access standard for systems operating at radio frequencies between 2 GHz and 11 GHz.

The IEEE 802.16a, 802.16e and 802.16g standards are incorporated herein by reference. More information on WiMAX can be found at the domain name "www.wimaxforum.org." WiMAX can be used to provide a WLP.

The ETSI HIPERMAN standards TR 101 031, TR 101 475, TR 101 493-1 through TR 101 493-3, TR 101 761-1 through TR 101 761-4, TR 101 762, TR 101 763-1 through TR 101 763-3 and TR 101 957 are incorporated herein by reference. More information on ETSI standards can be found at the domain name "www.etsi.org." ETSI HIPERMAN can be used to provide a WLP.

In one embodiment, the plural server network devices 20, 22, 24, 26 include a connection to plural network interface cards (NICs) in a backplane connected to a communications bus. The NIC cards provide gigabit/second ($1 \times 10^9$ bits/second) communications speed of electronic information. This allows "scaling out" for fast electronic content retrieval. The NICs are connected to the plural server network devices 20, 22, 24, 26 and the cloud communications network 18. However, the present invention is not limited to the NICs described and other types of NICs in other configurations and connections with and/or without a buses can also be used to practice the invention.

In one embodiment, network devices 12, 14, 16, 98-106, 20, 22, 24, 26 and wired and wireless interfaces including the NICs include "4G" components. "4G" refers to the fourth generation of wireless communications standards and speeds of 100 megabits/second to gigabits/second or more. 4G includes peak speed requirements for 4G service at least 100 Mbit/s for high mobility communication (e.g., trains, vehicles, etc.) and 1 Gbit/s for low mobility communication (e.g., pedestrians and stationary users, etc.).

4G technologies are a successor to 3G and 2G standards. The nomenclature of the generations generally refers to a change in the fundamental nature of the service. The first was the move from analogue (1G) to digital (2G) transmission. This was followed by multi-media support, spread spectrum transmission and at least 200 kbits/second (3G). The 4G NICs include IP packet-switched NICs, wired and wireless ultra-broadband (i.e., gigabit speed) access NICs, Worldwide Interoperability for Microwave Access (WiMAX) NICs WiMAX Long Term Evolution (LTE) and/or multicarrier transmission NICs. However, the present invention is not limited to this embodiment and 1G, 2G and 3G and/or any combination thereof, with or with 4G NICs can be used to practice the invention.

In one embodiment of the invention, the WiMAX interfaces includes WiMAX 4G Long Term Evolution (LTE) interfaces. The ITU announced in December 2010 that WiMAX and LTE are 4G technologies. One of the benefits of 4G LTE is the ability to take advantage of advanced topology networks including those on cloud communications networks 18 such as optimized heterogeneous networks with a mix of macrocells with low power nodes such as picocells, femtocells and new relay nodes. LTE further improves the capacity and coverage, and helps ensures user fairness. 4G LTE also introduces multicarrier technologies for ultra-wide bandwidth use, up to 100 MHz of spectrum supporting very high data rates.

In one embodiment, of the invention, the wireless interfaces also include wireless personal area network (WPAN) interfaces. As is known in the art, a WPAN is a personal area network for interconnecting devices centered around an individual person's devices in which the connections are wireless. A WPAN interconnects all the ordinary computing and communicating devices that a person has on their desk (e.g. computer, etc.) or carry with them (e.g., PDA, mobile phone, smart phone, table computer two-way pager, etc.)

A key concept in WPAN technology is known as "plugging in." In the ideal scenario, when any two WPAN-equipped devices come into close proximity (within several meters and/or feet of each other) or within a few miles and/or kilometers of a central server (not illustrated), they can communicate via wireless communications as if connected by a cable. WPAN devices can also lock out other devices selectively, preventing needless interference or unauthorized access to secure information. Zigbee is one wireless protocol used on WPAN networks such as cloud communications network 18.

The one or more target network devices 12, 14, 16, 98-106 and one or more server network devices 20, 22, 24, 26 also communicate with each other and other network devices with near field communications (NFC) and/or machine-to-machine (M2M) communications.

"Near field communication (NFC)" is a set of standards for smartphones and similar devices to establish radio communication with each other by touching them together or bringing them into close proximity, usually no more than a few centimeters. Present and anticipated applications include contactless transactions, data exchange, and simplified setup of more complex communications such as Wi-Fi. Communication is also possible between an NFC device and an unpowered NFC chip, called a "tag" including radio frequency identifier (RFID) tags.

NFC standards cover communications protocols and data exchange formats, and are based on existing radio-frequency identification (RFID) standards including ISO/IEC 14443 and FeliCa. These standards include ISO/IEC 1809 and those defined by the NFC Forum, all of which are incorporated by reference.

"Machine to machine (M2M)" refers to technologies that allow both wireless and wired systems to communicate with other devices of the same ability. M2M uses a device to capture an event (such as option purchase, etc.), which is relayed through a network (wireless, wired cloud, etc.) to an application (software program), that translates the captured event into meaningful information. Such communication was originally accomplished by having a remote network of machines relay information back to a central hub for analysis, which would then be rerouted into a system like a personal computer.

However, modern M2M communication has expanded beyond a one-to-one connection and changed into a system of networks that transmits data many-to-one and many-to-many to plural different types of devices and appliances. The expansion of IP networks across the world has made it far easier for M2M communication to take place and has lessened the amount of power and time necessary for information to be communicated between machines.

Short Message Service (SMS) is a text messaging service component of phone, Web, or mobile communication systems. It uses standardized communications protocols to allow fixed line or mobile phone devices to exchange short text messages.

SMS messages were defined in 1985 as part of the Global System for Mobile Communications (GSM) series of standards as a means of sending messages of up to 160 characters to and from GSM mobile handsets. Though most SMS messages are mobile-to-mobile text messages, support for the service has expanded to include other mobile technologies, such as ANSI CDMA networks and Digital AMPS as well as satellite and landline networks.

However, the present invention is not limited to such wireless interfaces and wireless networks and more, fewer and/or other wireless interfaces can be used to practice the invention.

Exemplary Wired Interfaces

In one embodiment of the present invention, the wired interfaces include wired interfaces and corresponding networking protocols for wired connections to the Public Switched Telephone Network (PSTN) and/or a cable television network (CATV) and/or satellite television networks (SATV) and/or three-dimensional television (3DTV), including HDTV that connect the network devices 12, 14, 16, 98-106, 20, 22, 24, 26 via one or more twisted pairs of copper wires, digital subscriber lines (e.g. DSL, ADSL, VDSL, etc.) coaxial cable, fiber optic cable, other connection media or other connection interfaces. The PSTN is any public switched telephone network provided by AT&T, GTE, Sprint, MCI, SBC, Verizon and others. The CATV is any cable television network provided by the Comcast, Time Warner, etc. However, the present invention is not limited to such wired interfaces and more, fewer and/or other wired interfaces can be used to practice the invention.

Television Services

In one embodiment, the cloud applications 30, 30' provide space planning services from television services over the cloud communications network 18. The television services include digital television services, including, but not limited to, cable television, satellite television, high-definition television, three-dimensional, televisions and other types of network devices.

However, the present invention is not limited to such television services and more, fewer and/or other television services can be used to practice the invention.

Internet Television Services

In one embodiment, the cloud applications 30, 30' provide space planning services from Internet television services over the cloud communications network 18. The television services include Internet television, Web-TV, and/or Internet Protocol Television (IPtv) and/or other broadcast television services.

"Internet television" allows users to choose a program or the television show they want to watch from an archive of programs or from a channel directory. The two forms of viewing Internet television are streaming content directly to a media player or simply downloading a program to a viewer's set-top box, game console, computer, or other mesh network device.

"Web-TV" delivers digital content via non-mesh broadband and mobile networks. The digital content is streamed to a viewer's set-top box, game console, computer, or other mesh network device.

"Internet Protocol television (IPtv)" is a system through which Internet television services are delivered using the architecture and networking methods of the Internet Protocol Suite over a packet-switched network infrastructure, e.g., the Internet and broadband Internet access networks, instead of being delivered through traditional radio frequency broadcast, satellite signal, and cable television formats.

However, the present invention is not limited to such Internet Television services and more, fewer and/or other Internet Television services can be used to practice the invention.

General Search Engine Services

In one embodiment, the cloud applications 30, 30' provide space planning services from general search engine services. A search engine is designed to search for information on a cloud communications network 18 such as the Internet including World Wide Web servers, HTTP, FTP servers etc. The search results are generally presented in a list of electronic results. The information may consist of web pages, images, electronic information, multimedia information, and other types of files. Some search engines also mine data available in databases or open directories. Unlike web directories, which are maintained by human editors, search engines typically operate algorithmically and/or are a mixture of algorithmic and human input.

In one embodiment, the cloud applications 30, 30' provide space planning services from general search engine services. In another embodiment, the cloud applications 30, 30' provide general search engine services by interacting with one or more other public search engines (e.g., GOOGLE, BING, YAHOO, etc.) and/or private search engine services.

In another embodiment, the cloud applications 30, 30' provide space planning services from specialized search engine services, such as vertical search engine services by interacting with one or more other public vertical search engines (e.g., GALAXY.COM, etc.) and/or private search engine services However, the present invention is not limited to such general and/or vertical search engine services and more, fewer and/or other general search engine services can be used to practice the invention.

Social Networking Services

In one embodiment, the cloud applications 30, 30' provide space planning services from one more social networking services including to/from one or more social networking web-sites (e.g., FACEBOOK, YOU-TUBE, TWITTER, MY-SPACE, etc.). The social networking web-sites also include, but are not limited to, social couponing sites, dating web-sites, blogs, RSS feeds, and other types of information web-sites in which messages can be left or posted for a variety of social activities.

However, the present invention is not limited to the social networking services described and other public and private social networking services can also be used to practice the invention.

Security and Encryption

Network devices 12, 14, 16, 20, 22, 24, 26, 97, 98-106 with wired and/or wireless interfaces of the present invention include one or more of the security and encryptions techniques discussed herein for secure communications on the cloud communications network 18.

Application programs 58 (FIG. 2) include security and/or encryption application programs integral to and/or separate from the cloud applications 30, 30' Security and/or encryption programs may also exist in hardware components on the network devices (12, 14, 16, 20, 22, 24, 26, 98-106) described herein and/or exist in a combination of hardware, software and/or firmware.

Wireless Encryption Protocol (WEP) (also called "Wired Equivalent Privacy) is a security protocol for WiLANs defined in the IEEE 802.11b standard. WEP is cryptographic privacy algorithm, based on the Rivest Cipher 4 (RC4) encryption engine, used to provide confidentiality for 802.11b wireless data.

RC4 is cipher designed by RSA Data Security, Inc. of Bedford, Mass., which can accept encryption keys of arbitrary length, and is essentially a pseudo random number generator with an output of the generator being XORed with a data stream to produce encrypted data.

One problem with WEP is that it is used at the two lowest layers of the OSI model, the physical layer and the data link layer, therefore, it does not offer end-to-end security. One another problem with WEP is that its encryption keys are static rather than dynamic. To update WEP encryption keys, an individual has to manually update a WEP key. WEP also typically uses 40-bit static keys for encryption and thus provides "weak encryption," making a WEP device a target of hackers.

The IEEE 802.11 Working Group is working on a security upgrade for the 802.11 standard called "802.11i." This supplemental draft standard is intended to improve WiLAN security. It describes the encrypted transmission of data between systems 802.11X WiLANs. It also defines new encryption key protocols including the Temporal Key Integrity Protocol (TKIP). The IEEE 802.11i draft standard, version 4, completed Jun. 6, 2003, is incorporated herein by reference.

The 802.11i is based on 802.1x port-based authentication for user and device authentication. The 802.11i standard includes two main developments: Wi-Fi Protected Access (WPA) and Robust Security Network (RSN).

WPA uses the same RC4 underlying encryption algorithm as WEP. However, WPA uses TKIP to improve security of keys used with WEP. WPA keys are derived and rotated more often than WEP keys and thus provide additional security. WPA also adds a message-integrity-check function to prevent packet forgeries.

RSN uses dynamic negotiation of authentication and selectable encryption algorithms between wireless access points and wireless devices. The authentication schemes proposed in the draft standard include Extensible Authentication Protocol (EAP). One proposed encryption algorithm is an Advanced Encryption Standard (AES) encryption algorithm.

Dynamic negotiation of authentication and encryption algorithms lets RSN evolve with the state of the art in security, adding algorithms to address new threats and continuing to provide the security necessary to protect information that WiLANs carry.

The NIST developed a new encryption standard, the Advanced Encryption Standard (AES) to keep government information secure. AES is intended to be a stronger, more efficient successor to Triple Data Encryption Standard (3DES). More information on NIST AES can be found at the domain name "www.nist.gov/aes."

DES is a popular symmetric-key encryption method developed in 1975 and standardized by ANSI in 1981 as ANSI X.3.92, the contents of which are incorporated herein by reference. As is known in the art, 3DES is the encrypt-decrypt-encrypt (EDE) mode of the DES cipher algorithm. 3DES is defined in the ANSI standard, ANSI X9.52-1998, the contents of which are incorporated herein by reference. DES modes of operation are used in conjunction with the NIST Federal Information Processing Standard (FIPS) for data encryption (FIPS 46-3, October 1999), the contents of which are incorporated herein by reference.

The NIST approved a FIPS for the AES, FIPS-197. This standard specified "Rijndael" encryption as a FIPS-approved symmetric encryption algorithm that may be used by U.S. Government organizations (and others) to protect sensitive information. The NIST FIPS-197 standard (AES FIPS PUB 197, November2001) is incorporated herein by reference.

The NIST approved a FIPS for U.S. Federal Government requirements for information technology products for sensitive but unclassified (SBU) communications. The NIST FIPS Security Requirements for Cryptographic Modules (FIPS PUB 140-2, May 2001) is incorporated herein by reference.

RSA is a public key encryption system which can be used both for encrypting messages and making digital signatures. The letters RSA stand for the names of the inventors: Rivest, Shamir and Adleman. For more information on RSA, see U.S. Pat. No. 4,405,829, now expired, and incorporated herein by reference.

"Hashing" is the transformation of a string of characters into a usually shorter fixed-length value or key that represents the original string. Hashing is used to index and retrieve items in a database because it is faster to find the item using the shorter hashed key than to find it using the original value. It is also used in many encryption algorithms.

Secure Hash Algorithm (SHA), is used for computing a secure condensed representation of a data message or a data file. When a message of any length $<2^{64}$ bits is input, the SHA-1 produces a 160-bit output called a "message digest." The message digest can then be input to other security techniques such as encryption, a Digital Signature Algorithm (DSA) and others which generates or verifies a security mechanism for the message. SHA-512 outputs a 512-bit message digest. The Secure Hash Standard, FIPS PUB 180-1, Apr. 17, 1995, is incorporated herein by reference.

Message Digest-5 (MD-5) takes as input a message of arbitrary length and produces as output a 128-bit "message digest" of the input. The MD5 algorithm is intended for digital signature applications, where a large file must be "compressed" in a secure manner before being encrypted with a private (secret) key under a public-key cryptosystem such as RSA. The IETF RFC-1321, entitled "The MD5 Message-Digest Algorithm" is incorporated here by reference.

Providing a way to check the integrity of information transmitted over or stored in an unreliable medium such as a wireless network is a prime necessity in the world of open computing and communications. Mechanisms that provide such integrity check based on a secret key are called "message authentication codes" (MAC). Typically, message authentication codes are used between two parties that share a secret key in order to validate information transmitted between these parties.

Keyed Hashing for Message Authentication Codes (HMAC), is a mechanism for message authentication using cryptographic hash functions. HMAC is used with any iterative cryptographic hash function, e.g., MD5, SHA-1, SHA-512, etc. in combination with a secret shared key. The cryptographic strength of HMAC depends on the properties of the underlying hash function. The IETF RFC-2101, entitled "HMAC: Keyed-Hashing for Message Authentication" is incorporated here by reference.

An Electronic Code Book (ECB) is a mode of operation for a "block cipher," with the characteristic that each possible block of plaintext has a defined corresponding cipher text value and vice versa. In other words, the same plaintext value will always result in the same cipher text value. Electronic Code Book is used when a volume of plaintext is separated into several blocks of data, each of which is then encrypted independently of other blocks. The Electronic Code Book has the ability to support a separate encryption key for each block type.

Diffie and Hellman (DH) describe several different group methods for two parties to agree upon a shared secret in such a way that the secret will be unavailable to eavesdroppers. This secret is then converted into various types of cryptographic keys. A large number of the variants of the DH method exist including ANSI X9.42. The IETF RFC-2631, entitled "Diffie-Hellman Key Agreement Method" is incorporated here by reference.

The HyperText Transport Protocol (HTTP) Secure (HTTPs), is a standard for encrypted communications on the World Wide Web. HTTPs is actually just HTTP over a Secure Sockets Layer (SSL). For more information on HTTP, see IETF RFC-2616 incorporated herein by reference.

The SSL protocol is a protocol layer which may be placed between a reliable connection-oriented network layer protocol (e.g. TCP/IP) and the application protocol layer (e.g. HTTP). SSL provides for secure communication between a source and destination by allowing mutual authentication, the use of digital signatures for integrity, and encryption for privacy.

The SSL protocol is designed to support a range of choices for specific security methods used for cryptography, message digests, and digital signatures. The security method are negotiated between the source and destination at the start of establishing a protocol session. The SSL 2.0 protocol specification, by Kipp E. B. Hickman, 1995 is incorporated herein by reference. More information on SSL is available at the domain name See "netscape.com/eng/security/SSL-2.html."

Transport Layer Security (TLS) provides communications privacy over the Internet. The protocol allows client/server applications to communicate over a transport layer (e.g., TCP) in a way that is designed to prevent eavesdropping, tampering, or message forgery. For more information on TLS see IETF RFC-2246, incorporated herein by reference.

In one embodiment, the security functionality includes Cisco Compatible EXtensions (CCX). CCX includes security specifications for makers of 802.11xx wireless LAN chips for ensuring compliance with Cisco's proprietary wireless security LAN protocols. As is known in the art, Cisco Systems, Inc. of San Jose, Calif. is supplier of networking hardware and software, including router and security products.

However, the present invention is not limited to such security and encryption methods described herein and more, fewer and/or other types of security and encryption methods can be used to practice the invention. The security and encryption methods described herein can also be used in various combinations and/or in different layers of the protocol stack 38 with each other.

Cloud Computing Networks

Figure 4:
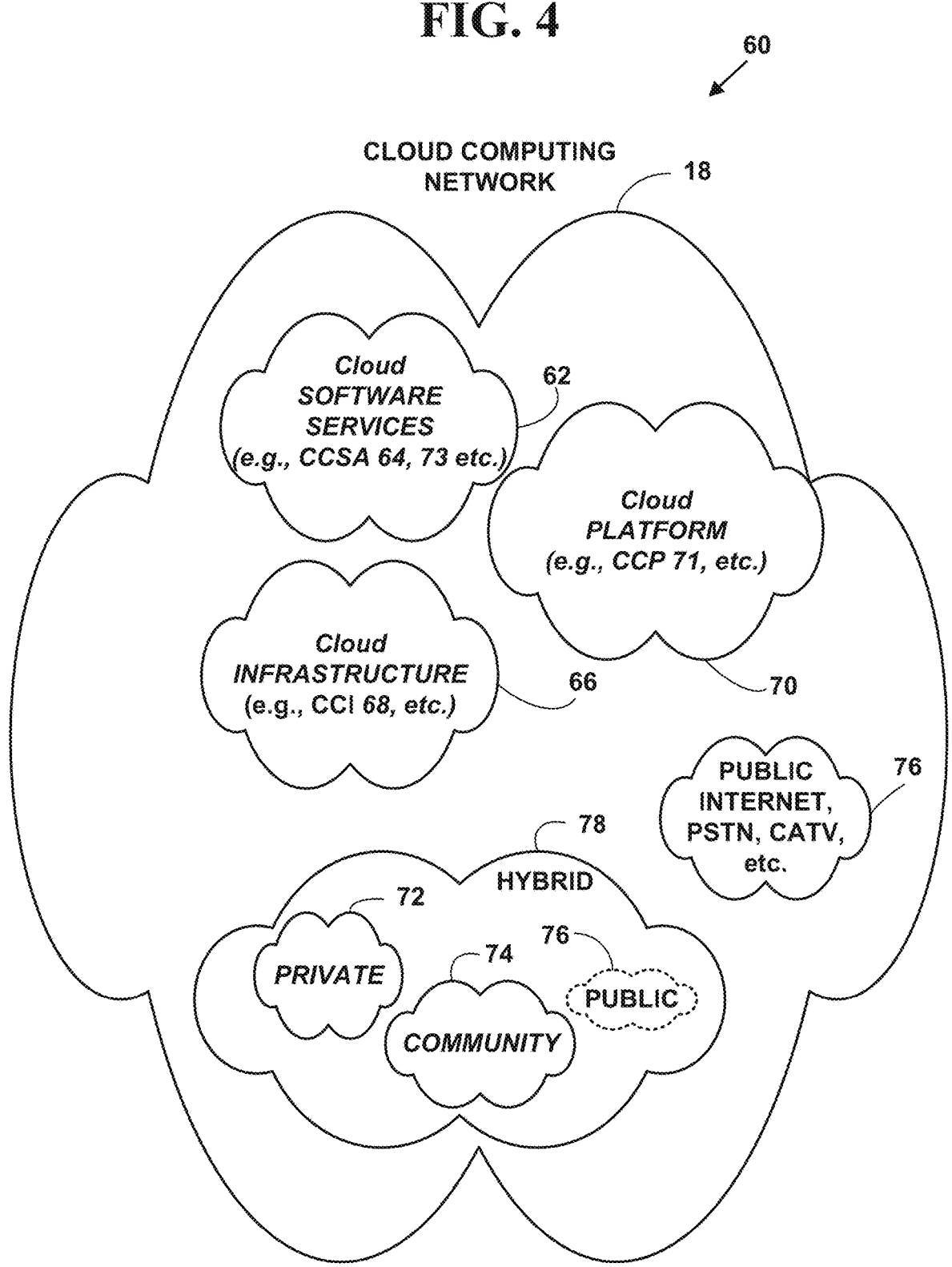
FIG. 4 is a block diagram illustrating an exemplary cloud computing network.

FIG. 4 is a block diagram 60 illustrating an exemplary cloud computing network 18. The cloud computing network 18 is also referred to as a "cloud communications network" 18. However, the present invention is not limited to this cloud computing model and other cloud computing models can also be used to practice the invention. The exemplary cloud communications network includes both wired and/or wireless components of public and private networks.

In one embodiment, the cloud computing network 18 includes a cloud communications network 18 comprising plural different cloud component networks 72, 74, 76, 78. "Cloud computing" is a model for enabling, on-demand network access to a shared pool of configurable computing resources (e.g., public and private networks, servers, storage, applications, and services) that are shared, rapidly provisioned and released with minimal management effort or service provider interaction.

This exemplary cloud computing model for electronic information retrieval promotes availability for shared resources and comprises: (1) cloud computing essential characteristics; (2) cloud computing service models; and (3) cloud computing deployment models. However, the present invention is not limited to this cloud computing model and other cloud computing models can also be used to practice the invention.

Exemplary cloud computing essential characteristics appear in Table 1. However, the present invention is not limited to these essential characteristics and more, fewer or other characteristics can also be used to practice the invention.

TABLE 1

On-demand Space Planning services. Space planning electronic content storage and retrievers can unilaterally provision computing capabilities, such as server time and network storage, as needed automatically without requiring human interaction with each network server on the cloud communications network 18.
Broadband network access. Space planning capabilities are available over plural broadband communications networks and accessed through standard mechanisms that promote use by heterogeneous thin or thick client platforms (e.g., mobile phones, smart phones 14, tablet computers 12, laptops, PDAs, wearable devices 98-106, etc.). The broadband network access includes high speed network access such as 3G and/or 4G wireless and/or wired and broadband and/or ultra-broad band (e.g., WiMAX, etc.) network access.
Resource pooling. Space planning content storage retrieval computing resources are pooled to serve multiple requesters using a multi-tenant model, with different physical and virtual resources dynamically assigned and reassigned according to space planning demand. There is location independence in that a requester of electronic content has no control and/or knowledge over the exact location of the provided by the space planning resources but may be able to specify location at a higher level of abstraction (e.g., country, state, or data center). Examples of pooled resources include storage, processing, memory, network bandwidth, virtual server network device and virtual target network devices.
Rapid elasticity. Capabilities can be rapidly and elastically provisioned, in some cases automatically, to quickly scale out and rapidly released to quickly scale for electronic content storage and retrieval. To the space planning electronic content storage and retrievers, the space planning capabilities available for provisioning appear to be unlimited and can be used in any quantity at any time.
Measured Services. Cloud computing systems automatically control and optimize resource use by leveraging a metering capability at some level of abstraction appropriate to the type of space planning service (e.g., storage, processing, bandwidth, custom space planning applications, etc.). Space planning usage is monitored, controlled, and reported providing transparency for both the electronic content provider and the electronic content requester of the utilized space planning electronic content storage retrieval service.

Exemplary cloud computing service models illustrated in FIG. 4 appear in Table 2. However, the present invention is not limited to these service models and more, fewer or other service models can also be used to practice the invention.

TABLE 2

Cloud Computing Software Applications 62 for Space Planning Services (CCSA, SaaS 64). The capability to use the provider's applications 30, 30' running on a cloud infrastructure 66. The cloud computing applications 62, are accessible from the server network device 20 from TABLE 2-continued various client devices 12, 14, 16, 98-106 through a thin client interface such as a web browser, etc. The user does not manage or control the underlying cloud infrastructure 66 including network, servers, operating systems, storage, or even individual cloud application 30, 30' capabilities, with the possible exception of limited user-specific application configuration settings.
Cloud Computing Infrastructure 66 for the Space Planning Services (CCI 68). The capability provided to the user is to provision processing, storage and retrieval, networks 18, 72, 74, 76, 78 and other fundamental computing resources where the consumer is able to deploy and run arbitrary software, which can include operating systems and applications 30, 30'. The user does not manage or control the underlying cloud infrastructure 66 but has control over operating systems, storage, deployed applications, and possibly limited control of select networking components (e.g., host firewalls, etc.).
Cloud Computing Platform 70 for the Space Planning Services (CCP 71). The capability provided to the user is to deploy onto the cloud infrastructure 66 created or acquired applications created using programming languages and tools supported servers 20, 22, 24, 26, etc. The user does not manage or control the underlying cloud infrastructure 66 including network, servers, operating systems, or storage, but has control over the deployed applications 30, 30' and possibly application hosting environment configurations.

Exemplary cloud computing deployment models appear in Table 3. However, the present invention is not limited to these deployment models and more, fewer or other deployment models can also be used to practice the invention.

TABLE 3

Private cloud network 72. The cloud network infrastructure is operated solely for an electronic content storage and retrieval. It may be managed by the space planning or a third party and may exist on premise or off premise.
Community cloud network 74. The cloud network infrastructure is shared by several different organizations and supports a specific space planning community that has shared concerns (e.g., mission, security requirements, policy, compliance considerations, etc.). It may be managed by the different organizations or a third party and may exist on premise or off premise.
Public cloud network 76. The cloud network infrastructure such as the Internet, PSTN, SATV, CATV, Internet TV, etc. is made available to the general public or a large industry group and is owned by one or more organizations selling cloud services.
Hybrid cloud network 78. The cloud network infrastructure 66 is a composition of two and/or more cloud networks 18 (e.g., private 72, community 74, and/or public 76, etc.) and/or other types of public and/or private networks (e.g., intranets, etc.) that remain unique entities but are bound together by standardized or proprietary technology that enables data and application portability (e.g., cloud bursting for load-balancing between clouds, etc.)

Cloud software 64 for space planning takes full advantage of the cloud paradigm by being service oriented with a focus on statelessness, low coupling, modularity, and semantic interoperability for electronic content retrieval. However, cloud software services 64 can include various states.

Cloud storage of desired electronic content on a cloud computing network includes agility, scalability, elasticity and multi-tenancy. Although a storage foundation may be comprised of block storage or file storage such as that exists on conventional networks, cloud storage is typically exposed to requesters of desired electronic content as cloud objects.

In one exemplary embodiment, the cloud application 30', also called a cloud server application 30', executing on a cloud server network device offers cloud services for space planning. The cloud applications 30, 30' offers the cloud computing Infrastructure 66, 68 as a Service 62 (IaaS), including a cloud software infrastructure service 62, the cloud Platform 70, 71 as a Service 62 (PaaS) including a cloud software platform service 62 and/or offers specific cloud Software services as a Service 62, 73 (SaaS) including a specific cloud software service SaaS 64 for space planning services including creating plural 3D prototype objects corresponding to actual objects for space planning on a desired physical space. The IaaS, PaaS and SaaS include one or more of cloud services 62 comprising networking, storage, server network device, virtualization, operating system, middleware, run-time, data and/or application services, or plural combinations thereof, on the cloud communications network 18.

Figure 5:
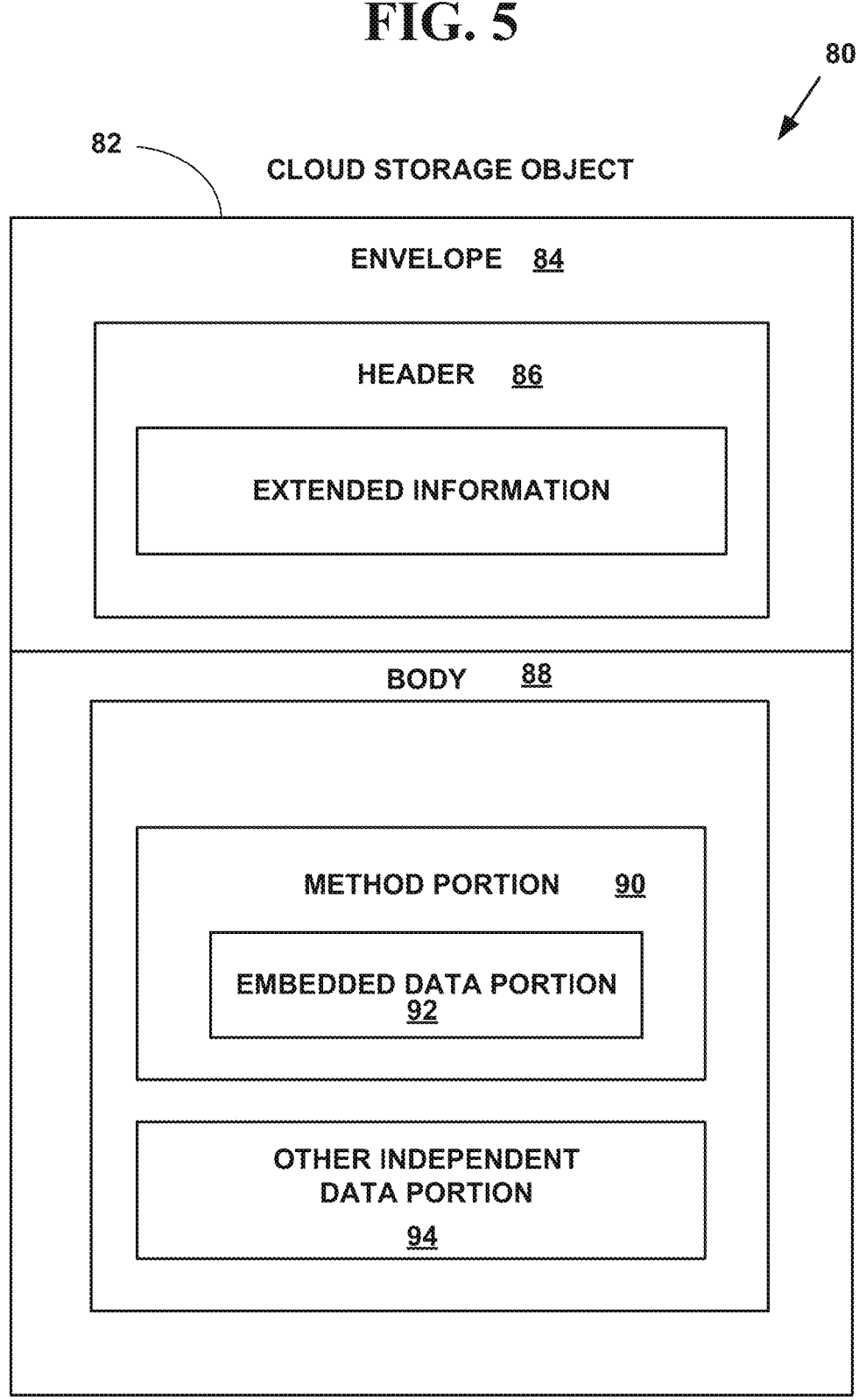
FIG. 5 is a block diagram illustrating an exemplary cloud storage object.

FIG. 5 is a block diagram 80 illustrating an exemplary cloud storage object 82.

The cloud storage object 82 includes an envelope portion 84, with a header portion 86, and a body portion 88. However, the present invention is not limited to such a cloud storage object 82 and other cloud storage objects and other cloud storage objects with more, fewer or other portions can also be used to practice the invention.

The envelope portion 84 uses unique namespace Uniform Resource Identifiers (URIs) and/or Uniform Resource Names (URNs), and/or Uniform Resource Locators (URLs) unique across the cloud communications network 18 to uniquely specify, location and version information and encoding rules used by the cloud storage object 82 across the whole cloud communications network 18. For more information, see IETF RFC-3305, Uniform Resource Identifiers (URIs), URLs, and Uniform Resource Names (URNs), the contents of which are incorporated by reference.

The envelope portion 84 of the cloud storage object 82 is followed by a header portion 86. The header portion 86 includes extended information about the cloud storage objects such as authorization and/or transaction information, etc.

The body portion 88 includes methods 90 (i.e., a sequence of instructions, etc.) for using embedded application-specific data in data elements 92. The body portion 88 typically includes only one portion of plural portions of application-specific data 92 and independent data 94 so the cloud storage object 82 can provide distributed, redundant fault tolerant, security and privacy features described herein.

Cloud storage objects 82 have proven experimentally to be a highly scalable, available and reliable layer of abstraction that also minimizes the limitations of common file systems. Cloud storage objects 82 also provide low latency and low storage and transmission costs.

Cloud storage objects 82 are comprised of many distributed resources, but function as a single storage object, are highly fault tolerant through redundancy and provide distribution of desired electronic content across public communication networks 76, and one or more private networks 72, community networks 74 and hybrid networks 78 of the cloud communications network 18. Cloud storage objects 82 are also highly durable because of creation of copies of portions of desired electronic content across such networks 72, 74, 76, 78 of the cloud communications network 18. Cloud storage objects 82 includes one or more portions of desired electronic content and can be stored on any of the 72, 74, 76, 78 networks of the cloud communications network 18. Cloud storage objects 82 are transparent to a requester of desired electronic content and are managed by cloud applications 30, 30'.

In one embodiment, cloud storage objects 82 are configurable arbitrary objects with a size up to hundreds of terabytes, each accompanied by with a few kilobytes of metadata. Cloud objects are organized into and identified by a unique identifier unique across the whole cloud communications network 18. However, the present invention is not limited to the cloud storage objects described, and more fewer and other types of cloud storage objects can be used to practice the invention.

Cloud storage objects 82 present a single unified namespace or object-space and manages desired electronic content by user or administrator-defined policies storage and retrieval policies. Cloud storage objects includes Representational state transfer (REST), Simple Object Access Protocol (SOAP), Lightweight Directory Access Protocol (LDAP) and/or Application Programming Interface (API) objects and/or other types of cloud storage objects. However, the present invention is not limited to the cloud storage objects described, and more fewer and other types of cloud storage objects can be used to practice the invention.

REST is a protocol specification that characterizes and constrains macro-interactions storage objects of the four components of a cloud communications network 18, namely origin servers, gateways, proxies and clients, without imposing limitations on the individual participants.

SOAP is a protocol specification for exchanging structured information in the implementation of cloud services with storage objects. SOAP has at least three major characteristics: (1) Extensibility (including security/encryption, routing, etc.); (2) Neutrality (SOAP can be used over any transport protocol such as HTTP, SMTP or even TCP, etc.), and (3) Independence (SOAP allows for almost any programming model to be used, etc.)

LDAP is a software protocol for enabling storage and retrieval of electronic content and other resources such as files and devices on the cloud communications network 18. LDAP is a "lightweight" version of Directory Access Protocol (DAP), which is part of X.500, a standard for directory services in a network. LDAP may be used with X.509 security and other security methods for secure storage and retrieval. X.509 is public key digital certificate standard developed as part of the X.500 directory specification. X.509 is used for secure management and distribution of digitally signed certificates across networks.

An API is a particular set of rules and specifications that software programs can follow to communicate with each other. It serves as an interface between different software programs and facilitates their interaction.

Wearable Devices

Wearable mobile technology" and/or "wearable devices" are clothing and accessories incorporating computer and advanced electronic technologies. Wearable mobile network devices provide several advantages including, but not limited to: (1) Quicker access to notifications. Important and/or summary notifications are sent to alert a user to view a whole new message. (2) Heads-up information. Digital eye wear allows users to display relevant information like directions without having to constantly glance down; (3) Always-on Searches. Wearable devices provide always-on, hands-free searches; and (4) Recorded data and feedback. Wearable devices also take telemetric data recordings and providing useful feedback for users for exercise, health, fitness, etc. activities.

Digital eyewear, such as GOOGLE Glass, Smart watches by SONY, NIKE, GARMIN, SAMSUNG, wrist bands and/or fitness bands by LG, NIKE, FITBIT, etc. and others are examples of wearable mobile devices. Just like mobile and non-mobiles phones, a current physical location of such wearable mobile devices must be determine in an emergency situation.

Figure 6:
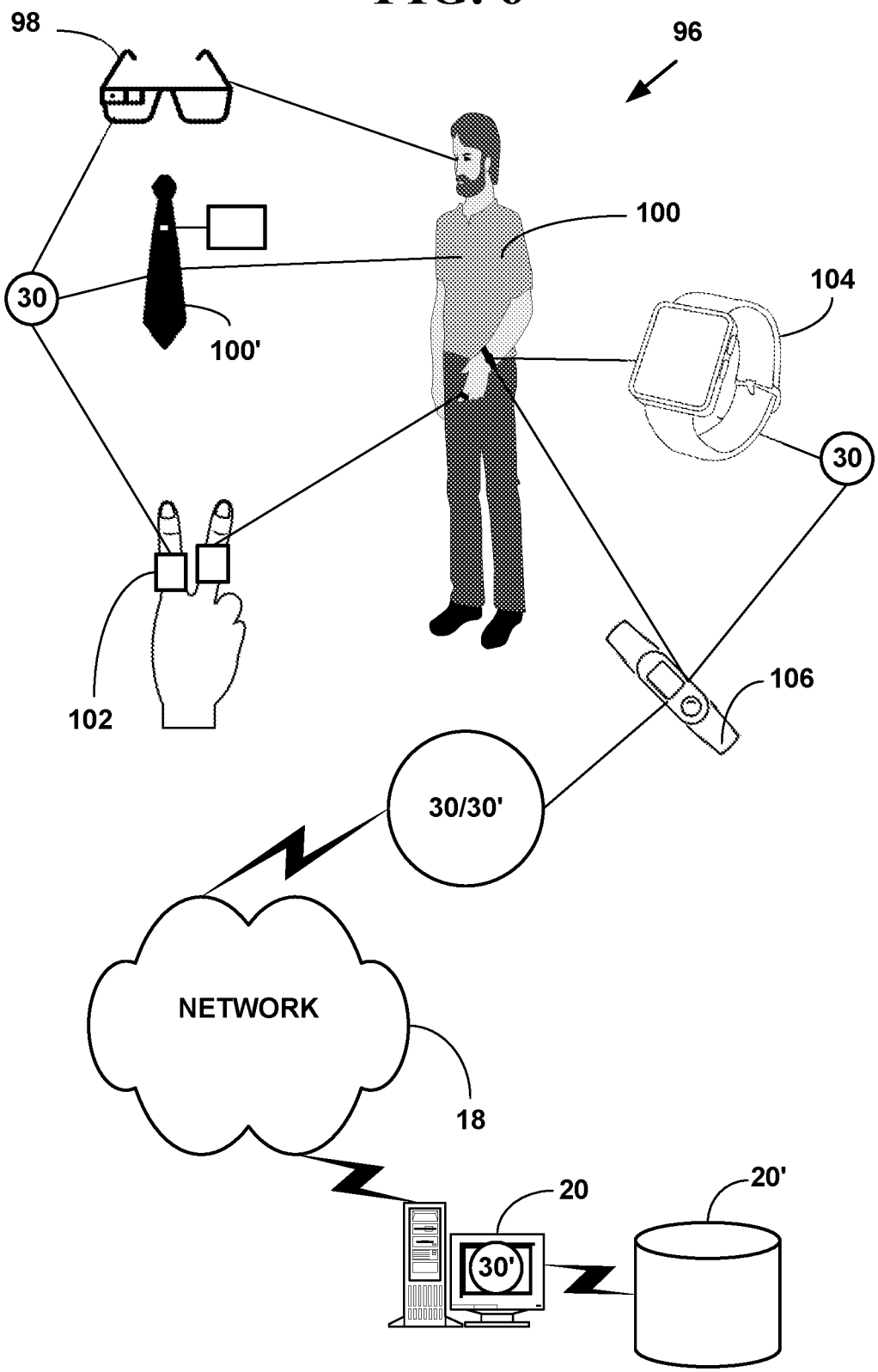
FIG. 6 is a block diagram illustrating exemplary wearable devices.

FIG. 6 is a block diagram 96 illustrating exemplary wearable devices 98-106 for exemplary space planning.

In one embodiment, the target network devices include wearable network devices 98-106. The wearable devices include one or more processors and include, but are not limited to, wearable digital glasses 98 (e.g., GOOGLE Glass, etc.), clothing 100 (e.g., smart ties 100', smart headwear, smart jackets, etc.), jewelry 102 (e.g., smart rings, smart earrings, etc.), smart watches 104 (e.g., SONY, NIKE, SAMSUNG, NIKE, GARMIN, etc.) and/or wrist bands and/or fitness bands 106 (e.g. GARMIN, FITBIT, POLAR, NIKE, JAWBONE, LG, etc.). The wearable mobile devices 98-106 includes cloud application 30 and/or 30'. All of the wearable devices 98-106 have one or more processors and/or selected ones have other components including, but not limited to, accelerometers, altimeters, cameras, GPS, music control, phone compatibility, etc. The for automatic vehicle identification number verification methods described herein are executed from the wearable devices 98-106. However, the present invention is not limited to such embodiments and more, fewer and other types of wearable devices can also be used to practice the invention.

Space Planning with Automatically Created Prototype Objects

Figure 7:
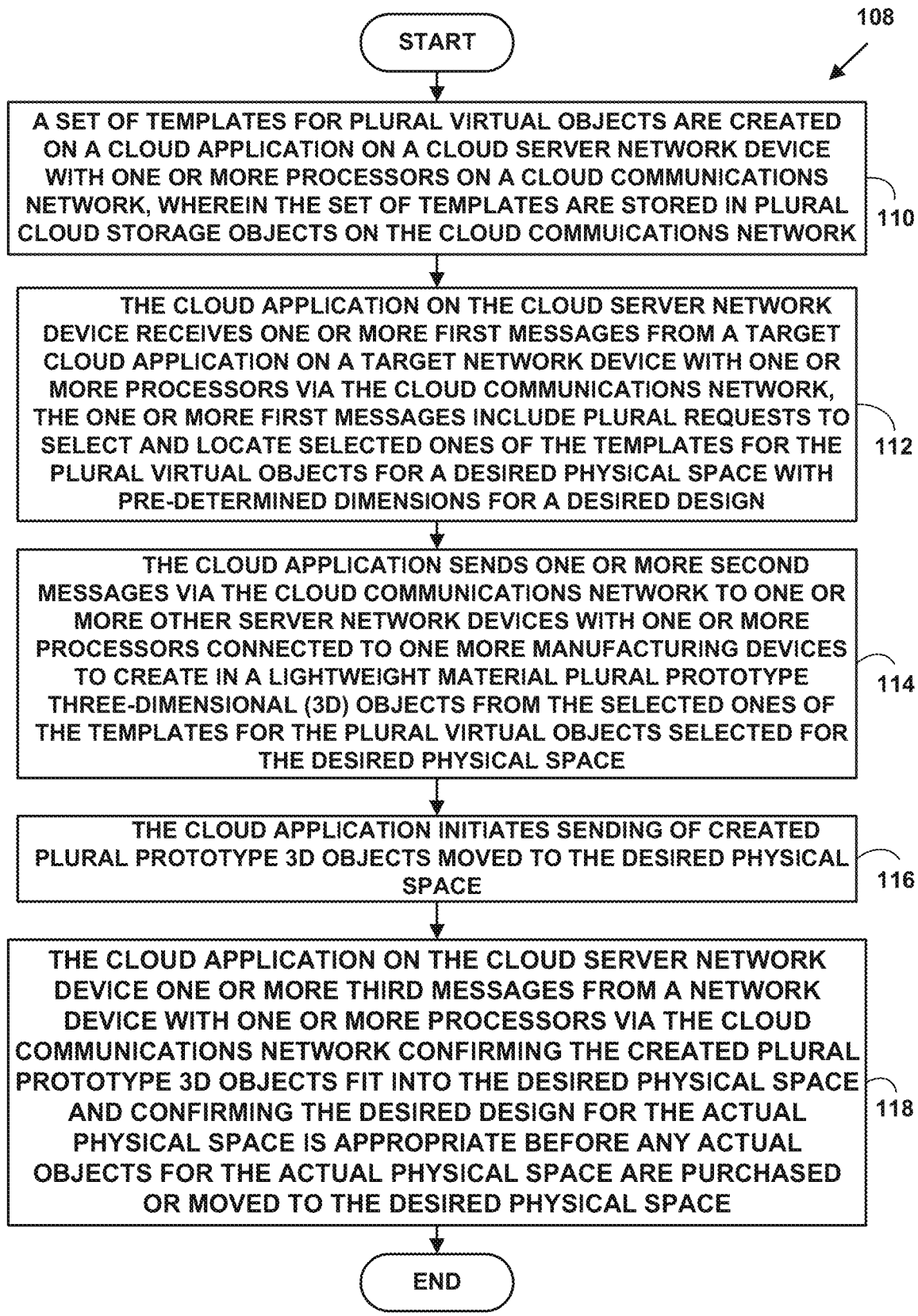
FIG. 7 is a flow diagram illustrating a method for space planning with created prototype objects.

FIG. 7 is a flow diagram illustrating a Method 108 for space planning with created prototype objects. At Step 110, a set of templates for plural virtual objects are created on a cloud application on a cloud server network device with one or more processors on a cloud communications network. The set of templates is stored in a plural cloud storage objects on the cloud communications network. At Step 112, the cloud application on the cloud server network device receives one or more first messages from a target cloud application on a target network device with one or more processors via the cloud communications network. The one or more first messages include plural requests to select and locate selected ones of the templates for the plural virtual objects for a desired physical space with pre-determined dimensions for a desired design. At Step 114, the cloud application sends one or more second messages via the cloud communications network to one or more other server network devices with one or more processors connected to one more manufacturing devices to automatically create in a lightweight material plural prototype three-dimensional (3D) objects from the selected ones of the templates for the plural virtual objects selected for the desired physical space. At Step 116, the cloud application initiates automatic sending of the created plural prototype 3D objects to the desired physical space. At Step 118, the cloud application on the cloud server network device receives one or more third messages from a network device with one or more processors via the cloud communications network confirming the created plural prototype 3D objects fit into the desired physical space and confirming the desired design for the actual physical space is appropriate before any actual objects for the actual physical space are purchased or moved to the desired physical space.

Figure 8:
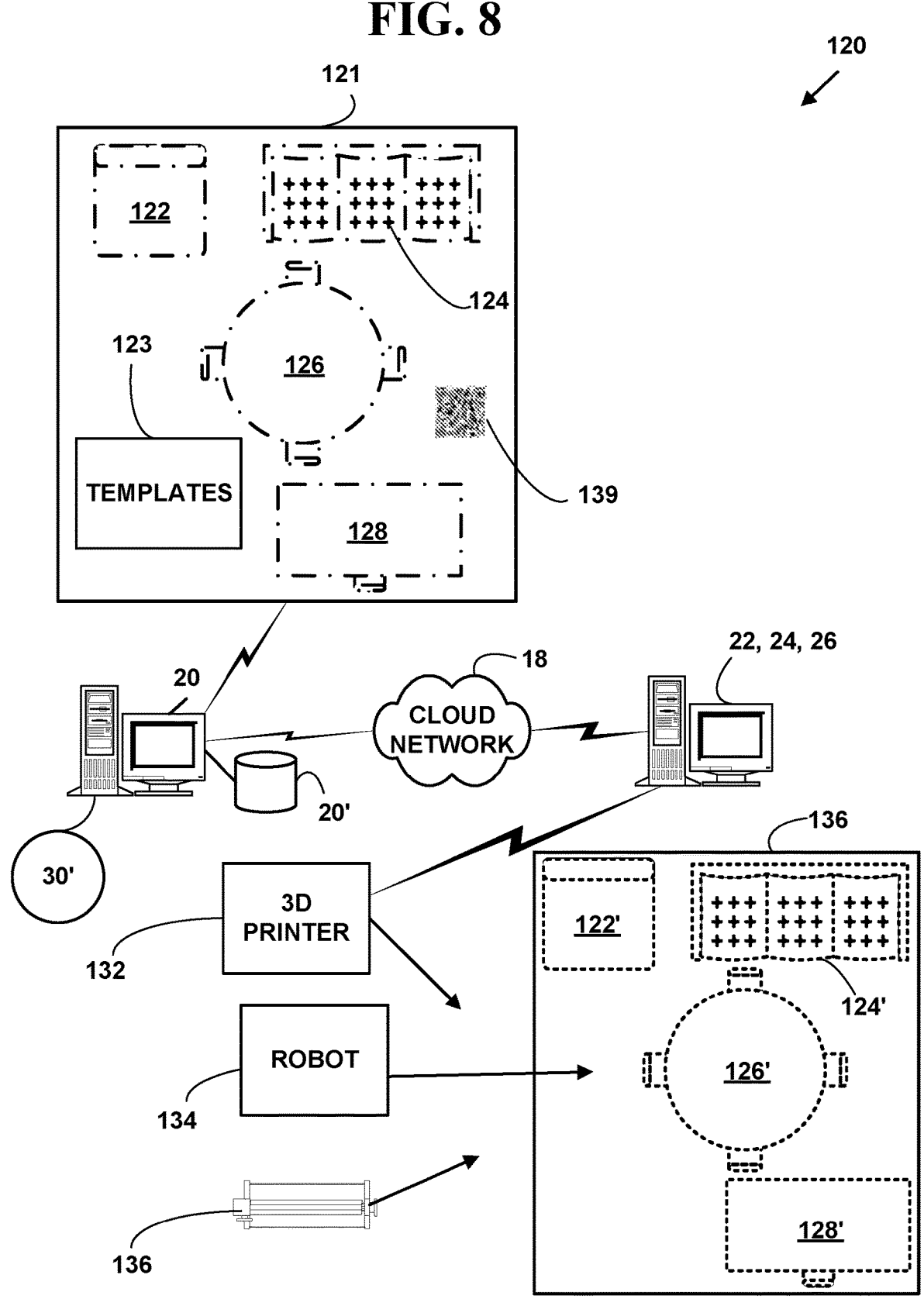
FIG. 8 is a block diagram illustrating space planning with created objects.

FIG. 8 is a block diagram 120 illustrating space planning with created objects. FIG. 8 includes a desired physical space with pre-determined dimensions represented by a virtual space 121, and selected ones of the templates for the plural virtual objects including a chair 122, couch 124, circular table with four chairs 126, and a desk with chair 128. Actual three dimensional (3D) objects 122'-128' (e.g., 122'a, 122'b, 122'c (FIG. 9), etc.) are created by 3D printers 132, robots 134, and/or manufacturing machines 136 that represent the plural virtual objects 122-128 and the actual objects 122"-128" (FIG. 9). However, the present invention is not limited to the 3D objects described or the manufacturing machines described and more, fewer and/or other 3D objects and manufacturing machines can be used to practice the invention.

FIG. 8 is illustrated with created 3D objects including furniture. However, the present invention is not limited to furniture and other types of created 3D objects can be used to practice the invention.

FIG. 9 is a block diagram 138 illustrating space planning with created 3D prototype objects. FIG. 9 illustrates actual objects 122"-128" represented by the plural virtual objects 122-128. For example, FIG. 9 illustrates a 3D printed web-framework skeleton and/or other type of framework skeleton 3D chair 122'a for a created 3D prototype 3D chair 122'a and a manufactured cardboard 3D chair 122'b and a manufactured 3D footprint chair 122'c, that all represent actual chair 122".

The elements in FIG. 9 are exemplary only to illustrate the features of the invention and the created 3D prototype objects 122'-128' are created as an exact match and/or inexact match of the actual object 122"-128".

Returning to FIG. 7, Method 108 is illustrated with an exemplary embodiment. However, the present is not limited to this exemplary embodiment and other embodiments can be used to practice the invention.

In such an exemplary embodiment at Step 110, a set of templates 123 for plural virtual objects are created on a cloud application 30' on a cloud server network device 20 with one or more processors on a cloud communications network 18. The set of templates 123 is stored in plural cloud storage objects 82 on the cloud communications network 18.

In one embodiment, the cloud application 30' includes a Building Information Modeling (BIM) program. In another embodiment, the target cloud application 30 includes a BIM program. However, the present invention is not limited to such embodiments and other cloud application and/or other design programs can be used to practice the invention.

Building Information Modeling (BIM) is a process including the generation and management of digital representations of physical and functional characteristics of physical spaces. Building Information Models (BIMs) programs span the whole design concept-to-occupation timespan.

A BIM model enables users to understand relationships between spaces, building materials, and various systems within a physical structure. BIM software can be used for every step of the process, from planning, to design, to construction. BIM solutions let users sequence the steps and elements of the building and design processes.

In one embodiment, the BIM modeling program includes an AUTODESK REVIT, AUTODESK INVENTOR, AUTOCAD, SKETCHUP, VECTORWORKS, MICROSTATION, ARCHICAD, SOLIDWORKS, and/or PROE, etc. modeling program. However, the present invention is not limited to such an embodiment and other 3D modeling programs and/or other design programs can be used to practice the invention.

At Step 112, the cloud application 30' on the cloud server network device 20 receives one or more first messages from a target cloud application 30 on a target network device 12, 14, 16, 98-106 with one or more processors via the cloud communications network 18. The one or more first messages include plural requests to select and locate selected ones 122-128 of the templates 123 for the plural virtual objects for a desired physical space 136 with pre-determined dimensions (e.g., X by Y by Z feet, X by Y by Z meters, etc.) for a desired design.

In one embodiment, the target cloud application 30 includes a 3D application in which virtual objects from the set of templates 123 can be selected and placed in a 3D virtual environment. In another embodiment the target cloud application 30 includes a 3D application in which virtual objects from the set of templates 123 can be selected and placed in a 3D virtual environment included digital photographs of a desired physical space collected by a user of the target network device 12, 14, 16, 98-106. However, the present invention is not limited to these embodiments and other embodiments and other types of target cloud applications can be used to practice the invention.

At Step 114, the cloud application 30' sends one or more second messages via the cloud communications network 18 to one or more other server network devices 22, 24, 26 with one or more processors connected to one more manufacturing devices 130, 132, 134 to automatically create in a lightweight material plural prototype three-dimensional (3D) objects from the selected ones of the templates 123 for the plural virtual objects 122-128 selected for the desired physical space 136.

One manufacturing device includes a "3D printer" 130 includes 3D printing or "Additive manufacturing." 3D printing is a process of making a three-dimensional solid object of virtually any shape from a digital model. 3D printing is achieved using an "additive process," where successive layers of material are laid down in different shapes. 3D printing is also considered distinct from traditional machining techniques, which mostly rely on the removal of material by methods such as cutting or drilling and are "subtractive" processes.

In one embodiment, a 3D printer 130 is a type of industrial robot 132 that is capable of carrying out an additive process under computer control. The 3D printing technology is used for both prototyping and distributed manufacturing with applications in architecture, construction (AEC), industrial design, automotive, aerospace, military, engineering, civil engineering, dental and medical industries, biotech (human tissue replacement), fashion, footwear, jewelry, eyewear, education, geographic information systems, food, and/or many other fields.

Another manufacturing devices includes "industrial robot" 134 and is a robot system used for manufacturing. Industrial robots are automated, programmable and capable of movement on three or more axis. Typical applications of robots include welding, painting, assembly, pick and place for products, product inspection, and testing; all accomplished with high endurance, speed, and precision. They also assist in material handling.

Another manufacturing devices includes a fabrication machine 134 that includes, but is not limited to machines such as waterjets, press brakes, laser systems, plasma systems, shears, grinders, lathes, mills, routers, Computer Numerical Control (CNC) machines, etc.

"CNC machining" is a manufacturing process in which pre-programmed computer software dictates the movement of factory tools and machinery. The process can be used to control a range of complex machinery, from grinders and lathes to mills and routers. CNC tools, move a cutter around a big table (X and Y axis) and move it up and down as well (Z axis) allowing it to make 3D movements and create products of all sorts of shapes and sizes.

In one embodiment, the prototype 3D objects 122'-128' are created out of cardboard, plastic, wood, metal and/or other lightweight materials. In one embodiment, the prototype 3D objects 122'-128' are created in plastic and/or vinyl as blow-up and/or inflatable objects that can be inflated and deflated. However, the present invention is not limited to these materials and more, fewer and/or other materials can be used to practice the invention.

For example, if the prototype 3D objects 122'-128' are 3D printed, only a framework skeleton (e.g., web framework, 122'a, 3D footprint 122'c (FIG. 9), etc.) of the objects. If the if the actual 3D objects 122'-128' are manufactured out of wood, the wood includes balsa wood and/or other lightweight wood. If the actual 3D objects 122'-128' are manufactured out of cardboard (e.g. 122'b (FIG. 9), etc.), the cardboard object may include plural 2D pieces that are assembled in the final 3D prototype object. However, the present invention is not limited to these materials and more, fewer and/or other materials can be used to practice the invention.

In one embodiment, the created prototype 3D objects are created with additional physical components that are included on the actual objects, including but not limited to, physical components that protrude from the actual objects, such a handle, knob, etc., and/or a physical component with one or more desired colors, a physical component covered with a desired covering with a desired color and/or texture (e.g., colored fabric, etc.). The colors and/or textures help confirm a desired design before the actual objects for the desired actual physical space 136 are purchased.

In one embodiment, the created prototype 3D objects include only a 3D footprint 122'c (i.e., length and width, etc.) of the actual 3D object. In such an embodiment, the 3D footprint includes prototype 3D objects that include an actual length and actual width for a corresponding actual 3D object and includes a pre-determined height (e.g., one to four inches, etc.) that is a height smaller than an actual height for the corresponding actual 3D object. For example, if a 3D prototype object 122' for a chair 122" is created, the 3D prototype object 122' includes only the footprint of the chair 122" with the actual length and width of the chair but with a height of only, for example, one to four inches in height. In such an embodiment, the footprint prototype 3D object allows a large number of prototype 3D objects to be created, transported and used to help confirm a desired design before the actual objects for the desired physical space 136 are purchased. For example, the footprint prototype 3D objects may be used for design for an actual desired physical space that includes a waiting room, an auditorium, etc. with a large number of chairs, seats, etc.

In another embodiment, the 3D prototype object 122' includes a hollow framework for the chair 122" including physical elements of the chair 112", (e.g., arms, legs, etc.). Such an embodiment, for example, may be 3D printed as a hollow web framework of the physical elements of the actual chair 112".

In another embodiment, Method 108 further includes creating plural 2D objects. In such an embodiment, the plural 2D objects are used in a manner similar to the 3D objects confirming a desired design for the actual physical space 136 is appropriate before any actual objects for the actual physical space are purchased or moved to the desired physical space 136.

However, the present invention is not limited to the created prototype 3D objects described and more, fewer and/or other types of created 3D prototype objects and/or combinations thereof, can be used to practice the invention.

In another embodiment at Step 116, the cloud application 30 first determines whether and one or more of the plural virtual objects have already been created as plural prototype 3D objects 122'-128' and stored in a warehouse, and if so the cloud application 30' requests any of the one or more of the plural virtual objects that have already been created and stored in the warehouse as plural prototype 3D objects 122'-128', be selected and moved out of warehouse for shipping to the desired physical space instead of request any of the one or more of the plural prototype 3D objects 122'-128' be created.

At Step 116, the cloud application 30' initiates automatic sending of the created plural prototype 3D objects 122'-128' to the desired physical space 136.

In one embodiment, the created plural prototype 3D objects 122'-128' are automatically packaged by a packaging machine and shipped to the desired physical space 136.

At Step 118, the cloud application 30' on the cloud server network device 20 receives one or more third messages from a network device with one or more processors via the cloud communications network 18 confirming the created plural prototype 3D objects 122'-128' fit into the desired physical space 136 and confirming the desired design for the actual physical space 136 is appropriate before any actual objects for the actual physical space are purchased or moved to the desired physical space 136.

In one embodiment, the network device includes the target network device that sent request message. In another embodiment, the network device includes another target network device that did not send the request messages, or a cloud server or other server network device 22, 24, 26, each with one or more processors.

In one embodiment, the created 3D prototype objects 122'-128' are used as "Patterns" that are brought to the desired physical space 136 with the pre-determined dimensions represented by the virtual space 118. Since the created prototype objects 122'-128' are made of lightweight materials they are easily transported to the desired physical space 136 and moved about the desired physical space 136. Within the desired physical space 136, the created prototype 3D objects 122'-128' can be easily moved around the desired physical space 136 and used to configure the prototype 3D objects 122'-128' in the actual physical space 136 without the inconvenience of moving the actual physical objects 122"-128", which are heavy, bulky, etc. into the desired physical space 136 and realizing later that one or more of the actual physical objects 122"-128" are not adequate for that actual physical space 136 (e.g., wrong size, wrong shape, wrong color, etc.).

By using the created 3D prototype objects 122-128' as physical "design "patterns (e.g., patterns for a living room, bedroom, office space, etc.) a designer is able to understand exact proportions of actual physical objects the 3D prototypes objects 122'-128' represent the desired physical space 136. As a result, the method and system allow a designer to be very precise in a final execution of a purchase of actual physical objects 122'-128" for the desired physical space 136 before purchasing and moving the actual physical objects 122"-128" into the desired physical space 136. The created 3D prototype objects 122'-128' used as design patterns are also reusable for other physical spaces once they created.

In one embodiment, once 3D prototype objects 122'-128' are created, the creation is noted in the set of templates 123 for the virtual objects 122-128. In such an embodiment, the created 3D prototype objects 122'-128' are stored in a warehouse and/or other physical storage space and reused and not recreated when selected. However, the present invention is not limited to such an embodiment and other embodiments, where the created 3D virtual objects 122'-128' are discarded and not reused to practice the invention.

The method and systems described herein includes specific templates created and used for space planning, including, but not limited to, the planning of actual physical spaces for: (1) Residential Housing; (2) Indoor and Outdoor Landscaping (e.g., plants, trees, ornamental elements, etc.); (3) Factories; (4) Warehouses; (5) Tradeshow Exhibits; (6) Art Galleries; (7) Interior design; (8) Lighting Elements; (9) Wall Hangings; (10) Architectural design and architecture elements; (11) Commercial spaces; and/or (12) Retail store design, store fixtures and shelf layout. However, the present invention is not limited to these types of space planning and more, fewer and/or other types of space planning can be used to practice the invention.

FIG. 10 is a flow diagram illustrating a Method 140 for space planning with created prototype objects. At Step 142, the set of templates for the plural virtual objects created on the cloud application are created with each template in the set of templates including a bar code added to the template for an actual object representing a virtual object. At Step 144, the cloud application on the cloud server network device receives one or more other messages from the target cloud application on the target network device with one or more processors via the cloud communications network. The one or more other messages include one or more requests to purchase one or more actual objects associated with the plural virtual objects and include one or more bar codes for one or more actual objects representing one or more virtual objects. Step 146, the cloud application sends one or more purchase messages via the cloud communications network to one or more product server network devices each with one or more processor automatically requesting purchase of the one or more actual objects selected with the one or more bar codes and automatically requesting shipping of the one or more actual objects to the desired physical space.

Method 140 is illustrated with an exemplary embodiment. However, the present is not limited to this exemplary embodiment and other embodiments can be used to practice the invention.

At Step 142, the set of templates 123 for the plural virtual objects created on the cloud application 30' are created with each template in the set of templates including a bar code 139 added to the template for an actual object 122"-128" representing a virtual object 122-128.

At Step 144, the cloud application 30' on the cloud server network device 20 receives one or more first messages from one or more other product server network devices 22, 24, 26 with one or more processors via the cloud communications network 18. The one or more first messages include one or more bar codes 139a-139b for one or more actual physical objects 122"-128" for one or more of the plural virtual objects 122-128 in the set of templates 123.

At Step 144, the cloud application 30' receives one or more other messages from the target cloud application 30 on the target network device 12, 14, 16, 98-106 with one or more processors via the cloud communications network 18. The one or more other messages include one or more requests to purchase one or more actual objects 122"-128" associated with the plural virtual objects 122-128 and include one or more bar codes 139a-139d for one or more actual objects 122"-128" representing one or more virtual objects 122-128.

At Step 146, the cloud server application 30' sends one or more purchase messages via the cloud communications network 18 to one or more product server network devices 22, 24, 26 each with one or more processor automatically requesting purchase of the one or more actual objects

122"-128" selected with the one or more bar codes 139a-139d and automatically requesting shipping of the one or more actual objects to the desired physical space 136.

A "barcode" is an optical machine-readable representation of data, which shows data about the object to which it attaches. Originally, barcodes represented data by varying the widths and spacings of parallel lines, and may be referred to as linear or 1 dimensional (1D). Later they evolved into rectangles, dots, hexagons and other geometric patterns in 2 dimensions (2D). Although 2D systems use a variety of symbols, they are generally referred to as barcodes as well. Barcodes originally were scanned by special-optical scanners called barcode readers, scanners and interpretive software are available on the target network devices, 12, 14, 16, 98-106.

Table 4 illustrates exemplary linear barcodes, the standards of all of which are incorporated by reference. However, the present invention is not limited to the exemplary linear barcodes listed in Table 4, and more fewer and other linear barcodes can also be used to practice the invention.

TABLE 4

| Linear Bar Codes |
|---|
| U.P.C. |
| Codabar |
| Code 25 - Non-interleaved 2 of 5 |
| Code 25 - Interleaved 2 of 5 |
| Code 39 |
| Code 93 |
| Code 128 |
| Code 128A |
| Code 128B |
| Code 128C |
| Code 11 |
| CPC Binary |
| DUN 14 |
| EAN 2 |
| EAN 5 |
| EAN 8, EAN 13 |
| Facing Identification Mark |
| GS1-128 (formerly known as UCC/EAN-128), incorrectly referenced as EAN 128 and UCC 128 |
| GS1 DataBar, formerly Reduced Space Symbology (RSS) |
| HIBC (HIBCC Health Industry Bar Code) |
| ITF-14 |
| Latent image barcode |
| Pharmacode |
| Plessey |
| PLANET |
| POSTNET |
| Intelligent Mail barcode |
| MSI |
| PostBar |
| RM4SCC/KIX |
| JAN |
| Telepen |

Table 5 illustrates exemplary matrix (2D) barcodes, the standards of all of which are incorporated by reference. However, the present invention is not limited to the exemplary matrix barcodes listed in Table 5, and more, fewer and other matrix barcodes can also be used to practice the invention.

| Matrix Bar Codes |
|---|
| 3-DI |
| ArrayTag |
| Aztec Code |
| Small Aztec Code |
| Chromatic Alphabet |

-continued

| Matrix Bar Codes |
|---|
| Codablock |
| Code 1 |
| Code 16K |
| Code 49 |
| ColorCode |
| Compact Matrix Code |
| CP Code |
| CyberCode |
| d-touch |
| DataGlyphs |
| Datamatrix |
| Datastrip Code |
| Dot Code A |
| EZcode |
| Grid Matrix Code |
| High Capacity Color Barcode |
| HueCode |
| INTACTA.CODE |
| InterCode |
| JAGTAG |
| Lorem ipsum |
| MaxiCode |
| mCode |
| MiniCode |
| MicroPDF417 |
| MMCC |
| Nintendo e-Reader#Dot code |
| Optar |
| PaperDisk |
| PDF417 |
| PDMark |
| QR Code |
| QuickMark Code |
| SmartCode |
| Snowflake Code |
| ShotCode |
| SPARQCode |
| SuperCod |
| Trillcode |
| UltraCode |
| UnisCode |
| VeriCode, VSCode |
| WaterCode |

In one specific embodiment, the cloud server application 30' and/or target cloud application 30 interacts with a bar code reader application 30". However, the present invention is not limited to a bar code reader application and other applications can also be used to practice the invention.

In one specific exemplary embodiment, a QR bar code 139a-139d is used. FIG. 9 illustrates plural QR bar codes 139a-139d. However, the present invention is not limited to QR codes and other types of bar codes can also be used to practice the invention.

Method 140 is used with Method 108 to provide accurate and convenient space planning for a desired physical space. Once the prototype 3D objects have been created with Method 108 and they fit into the desired space, the corresponding actual objects 122"-128" can be automatically and directly purchased and shipped to the desired physical space 136 with Method 140 by selecting a virtual object 122-128 and selecting one or more bar codes 139a-139d associated with the virtual object 122-128. The one or more bar codes 139 allow an actual 3D objects to be automatically and directly purchased from a desired product provider.

The method and system described herein provide space planning with created prototype objects. Templates for virtual objects are provided on a cloud application on a cloud server network device to create prototype objects. Actual prototype three dimensional (3D) objects are created in lightweight materials from selected templates with 3D printers, robots and/or manufacturing machines. The created prototype 3D objects are moved to and used in an actual physical space to confirm how actual objects represented by the created 3D prototype objects will fit in the actual physical space.

It should be understood that the architecture, programs, processes, methods and systems described herein are not related or limited to any particular type of computer or network system (hardware or software), unless indicated otherwise. Various types of specialized computer systems may be used with or perform operations in accordance with the teachings described herein.

In view of the wide variety of embodiments to which the principles of the present invention can be applied, it should be understood that the illustrated embodiments are exemplary only, and should not be taken as limiting the scope of the present invention. For example, the steps of the flow diagrams may be taken in sequences other than those described, and more or fewer elements may be used in the block diagrams.

While various elements of the preferred embodiments have been described as being implemented in software, in other embodiments hardware and/or firmware implementations may alternatively be used, and/or vice-versa.

Therefore, all embodiments that come within the scope and spirit of the inventions described herein and equivalents thereto are claimed as the invention.

I claim:

1. A method for space planning with created prototype objects, comprising:

creating a set of templates for a plurality of virtual design objects on a cloud application on a cloud server network device with one or more processors on a cloud communications network, wherein the set of templates is stored in a plurality of cloud storage objects on the cloud communications network;

receiving, on the cloud application on the cloud server network device, one or more messages from a target cloud application on a target network device with one or more processors via the cloud communications network, wherein the one or more messages include one or more requests to select one or more of the plurality of virtual objects for a desired design for a desired physical space with pre-determined dimensions;

sending, from the cloud application, one or more second messages via the cloud communications network to one or more other server network devices with one or more processors connected to one or more manufacturing devices to automatically create in a lightweight material a plurality of prototype three-dimensional (3D) objects from the selected ones of the templates for the plurality of virtual objects selected for the desired physical space;

initiating, from the cloud application, automatic sending of the created plurality of prototype 3D objects to the desired physical space; and receiving, on the cloud application on the cloud server network device, one or more third messages from a network device with one or more processors via the cloud communications network confirming the created plurality of prototype 3D objects fit into the desired physical space and confirming a desired design for the actual physical space before any actual objects for the actual physical space are purchased or moved to the desired physical space.

2. The method of claim 1 wherein the plurality of prototype 3D objects are created in a lightweight material including balsa wood, plastic, or cardboard.

3. The method of claim 1 wherein the plurality of prototype 3D objects are created in a lightweight material including plastic or vinyl and includes prototype 3D objects that are inflatable objects.

4. The method of claim 1 wherein the plurality of prototype 3D objects are created as a framework skeleton or hollow framework skeleton of an actual 3D object.

5. The method of claim 1 wherein the plurality of prototype 3D objects are created as a 3D footprint of any actual 3D object including an actual length and width for a corresponding actual 3D object and with a pre-determined height that is a height smaller than an actual height for the corresponding actual 3D object.

6. The method of claim 1 further comprising creating a plurality of 2D prototype objects for a plurality of actual objects, wherein the plurality of 2D prototype objects include a 2D footprint including an actual length and width for a corresponding actual 2D object.

7. The method of claim 1 wherein the one or more manufacturing devices include 3D printers, robots or fabrication machines.

8. The method of claim 1 wherein the cloud application includes a Building Information Modeling (BIM) program allowing the plurality of prototype 3D objects to be requested from within the BIM program and automatically created from the BIM program.

9. The method of claim 1 wherein the target cloud application includes a Building Information Modeling (BIM) program.

10. The method of claim 1 wherein the cloud communications network comprises: one or more public communications networks, one or more private communications networks, one or more community network or one or more hybrid networks and the cloud communications network includes a cloud computing Infrastructure as a Service (IaaS), a cloud Platform as a Service (PaaS) and Specific cloud software Services as a Service (SaaS) including SaaS cloud software services for automatically creating the plurality of prototype three-dimensional (3D) objects.

11. The method of claim 10 wherein the cloud application is provided as the SaaS for automatically creating the plurality of prototype three-dimensional (3D) objects.

12. The method of claim 1 wherein the created 3D prototype objects are reusable for other physical spaces once they created and are used for confirming other desired designs for other actual physical spaces before any actual objects for the other actual physical spaces are purchased or moved to the other desired physical spaces.

13. The method of claim 1 wherein the set of templates include specific templates for planning of actual physical spaces for: (1) residential housing; (2) indoor and outdoor landscaping (e.g., plants, trees, ornamental elements, etc.); (3) factories; (4) warehouses; (5) tradeshow exhibits; (6) art galleries; (7) Interior design; (8) lighting elements; (9) wall hangings; (10) architectural design and architecture elements; (11) commercial spaces; and (12) retail store design, store fixtures and shelf layout.

14. The method of claim 1 wherein the step of sending from the cloud application sends one or more second messages further includes:

first determining from the cloud application whether and one or more of the plurality of virtual objects have already been created and stored in a warehouse, and if so, requesting any of the one or more of the plurality of virtual objects have already been created and stored in the warehouse as prototype three-dimensional (3D) objects, be selected and moved out of the warehouse for shipping to the desired physical space instead of requesting the prototype three-dimensional (3D) objects be created.

15. The method of claim 1 wherein the plurality of prototype three-dimensional (3D) objects are created with additional physical components including, physical components that protrude the plurality of prototype three-dimensional (3D) objects or physical components of a desired color or texture.

16. The method of claim 1 further comprising:
creating the set of templates for the plurality of virtual objects on the cloud application with each template in the set of templates including a bar code for an actual object representing a virtual object;
receiving on the cloud application on the cloud server network device one or more other messages from the target cloud application on the target network device with one or more processors via the cloud communications network, wherein the one or more other messages include one or more requests to purchase one or more actual objects associated with the plurality of virtual objects and include one or more bar codes for one or more actual objects representing one or more virtual objects; and
sending from the cloud server application one or more purchase messages via the cloud communications network to one or more product server network devices each with one or more processor automatically requesting purchase of the one or more actual objects selected with the one or more bar codes and shipping to the desired physical space.

17. The method of claim 16 wherein the one or more bar codes include one or more QR bar codes.

18. The method of claim 1 wherein the plurality of created 3D prototype objects are used as a design pattern for the desired physical space.

19. A non-transitory computer readable medium on one or more network devices have a plurality of instructions for causing one or more processors on the one or more network devices to execute the steps of:
creating a set of templates for a plurality of virtual design objects on a cloud application on a cloud server network device with one or more processors on a cloud communications network, wherein the set of templates is stored in a plurality of cloud storage objects on the cloud communications network;
receiving, on the cloud application on the cloud server network device, one or more messages from a target cloud application on a target network device with one or more processors via the cloud communications network, wherein the one or more messages include one or more requests to select one or more of the plurality of virtual objects for a desired design for a desired physical space with pre-determined dimensions;

sending, from the cloud application, one or more second messages via the cloud communications network to one or more other server network devices with one or more processors connected to one or more manufacturing devices to automatically create in a lightweight material a plurality of prototype three-dimensional (3D) objects from the selected ones of the templates for the plurality of virtual objects selected for the desired physical space;
initiating, from the cloud application, automatic sending of the created plurality of prototype 3D objects to the desired physical space; and
receiving, on the cloud application on the cloud server network device, one or more third messages from a network device with one or more processors via the cloud communications network confirming the created plurality of prototype 3D objects fit into the desired physical space and confirming a desired design for the actual physical space before any actual objects for the actual physical space are purchased or moved to the desired physical space.

20. A system for space planning with created prototype objects, comprising in combination:
for creating a set of templates for a plurality of virtual design objects on a cloud application on a cloud server network device with one or more processors on a cloud communications network, wherein the set of templates is stored in a plurality of cloud storage objects on the cloud communications network;
for receiving, on the cloud application on the cloud server network device, one or more messages from a target cloud application on a target network device with one or more processors via the cloud communications network, wherein the one or more messages include one or more requests to select one or more of the plurality of virtual objects for a desired design for a desired physical space with pre-determined dimensions;
for sending, from the cloud application, one or more second messages via the cloud communications network to one or more other server network devices with one or more processors connected to one or more manufacturing devices to automatically create in a lightweight material a plurality of prototype three-dimensional (3D) objects from the selected ones of the templates for the plurality of virtual objects selected for the desired physical space;
for initiating, from the cloud application, automatic sending of the created plurality of prototype 3D objects to the desired physical space; and
for receiving, on the cloud application on the cloud server network device, one or more third messages from a network device with one or more processors via the cloud communications network confirming the created plurality of prototype 3D objects fit into the desired physical space and confirming a desired design for the actual physical space before any actual objects for the actual physical space are purchased or moved to the desired physical space.

* * * * *